United States Patent
Choi et al.

(10) Patent No.: US 11,082,851 B2
(45) Date of Patent: Aug. 3, 2021

(54) METHOD AND APPARATUS FOR PROCESSING AUDIO SIGNAL BY USING BLUETOOTH TECHNOLOGY

(71) Applicant: LG ELECTRONICS INC., Seoul (KR)

(72) Inventors: Jingu Choi, Seoul (KR); Jonghyun Baik, Seoul (KR); Taeyoung Song, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/495,046

(22) PCT Filed: Mar. 19, 2018

(86) PCT No.: PCT/KR2018/003194
§ 371 (c)(1),
(2) Date: Sep. 17, 2019

(87) PCT Pub. No.: WO2018/169380
PCT Pub. Date: Sep. 20, 2018

(65) Prior Publication Data
US 2020/0275250 A1    Aug. 27, 2020

Related U.S. Application Data

(60) Provisional application No. 62/472,603, filed on Mar. 17, 2017.

(51) Int. Cl.
*H04W 12/084*    (2021.01)
*H04B 17/318*    (2015.01)
(Continued)

(52) U.S. Cl.
CPC ........... *H04W 12/084* (2021.01); *G10L 15/22* (2013.01); *H04B 17/318* (2015.01); *H04W 4/12* (2013.01);
(Continued)

(58) Field of Classification Search
CPC ..... H04W 12/0804; H04W 4/23; H04W 4/80; H04W 12/04031; H04W 12/0013;
(Continued)

(56) References Cited

U.S. PATENT DOCUMENTS 9,544,633 B2 * 1/2017 Lee .................. H04N 21/42221
2003/0100326 A1 * 5/2003 Grube .................. H04W 84/08
455/515

(Continued)

FOREIGN PATENT DOCUMENTS

| KR | 10-1573760 B1 | 12/2015 |
|----|---------------|---------|
| KR | 10-2017-0016883 A | 2/2017 |
| WO | WO 2016/168409 A1 | 10/2016 |

*Primary Examiner* — Kwang B Yao
*Assistant Examiner* — Syed M Bokhari
(74) *Attorney, Agent, or Firm* — Birch, Stewart, Kolasch & Birch, LLP

(57) ABSTRACT

Disclosed herein is a method and apparatus for processing A first device for processing a voice command received from at least one device using a Bluetooth low energy technology, comprising: Specifically, a method performed by a first device includes transmitting a first advertising message to a peripheral device; receiving a first request message requesting establishment of an audio channel for transmitting and receiving the voice command from a second device; establishing the audio channel with the second device; and receiving a voice command instructing performance of a particular service from the second device through the audio channel.

12 Claims, 28 Drawing Sheets

(51) Int. Cl.
- *H04W 4/23* (2018.01)
- *H04W 4/80* (2018.01)
- *G10L 15/22* (2006.01)
- *H04W 4/12* (2009.01)
- *H04W 12/033* (2021.01)
- *H04W 12/086* (2021.01)
- *H04W 12/088* (2021.01)
- *H04W 12/0431* (2021.01)

(52) U.S. Cl.
CPC .............. *H04W 4/23* (2018.02); *H04W 4/80* (2018.02); *H04W 12/033* (2021.01); *H04W 12/0431* (2021.01); *H04W 12/086* (2021.01); *H04W 12/088* (2021.01); *G10L 2015/223* (2013.01)

(58) Field of Classification Search
CPC .............. H04W 4/12; H04W 12/0806; H04W 12/0808; H04W 4/02; H04W 8/00; H04W 76/14; H04B 17/318; G10L 15/22; G10L 2015/223; G06F 3/167
USPC .......................................................... 370/329
See application file for complete search history.

(56) References Cited

U.S. PATENT DOCUMENTS

| | | |
|---|---|---|
| 2009/0158041 A1 | 6/2009 | Kang et al. |
| 2013/0260739 A1* | 10/2013 | Saino ...................... G06F 9/547 455/419 |
| 2015/0289082 A1* | 10/2015 | Salokannel ............... G01S 1/24 455/41.2 |
| 2016/0029149 A1 | 1/2016 | Morikawa et al. |
| 2017/0025122 A1* | 1/2017 | Choi ....................... G06F 3/167 |
| 2017/0034646 A1* | 2/2017 | Song ..................... H04W 8/005 |
| 2017/0325056 A1* | 11/2017 | Mehta ................... H04M 11/04 |
| 2019/0387458 A1* | 12/2019 | Li ........................... H04W 4/70 |

* cited by examiner

[FIG. 1]
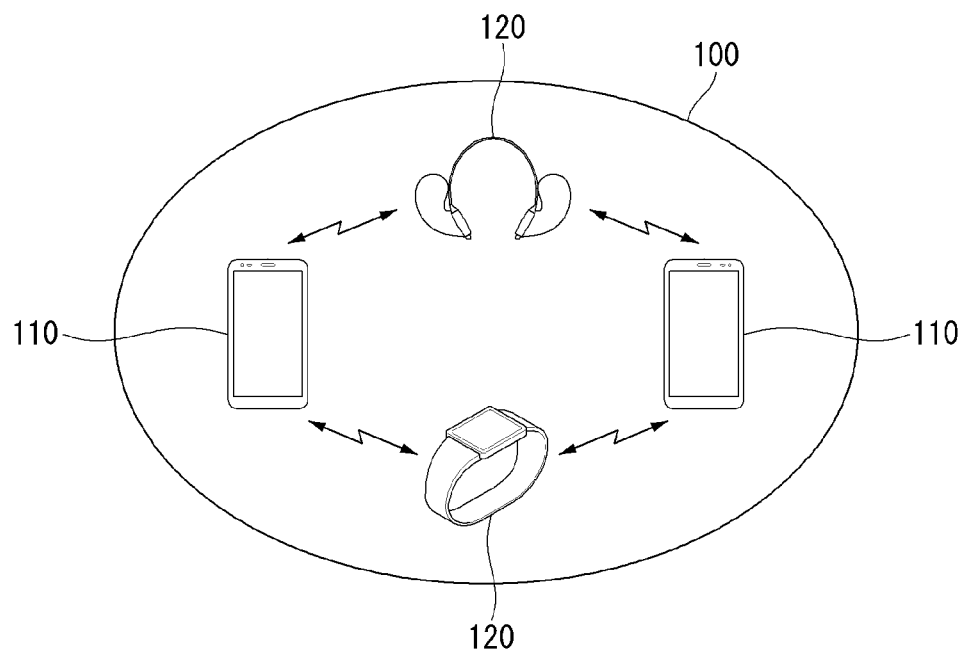

[FIG. 2]
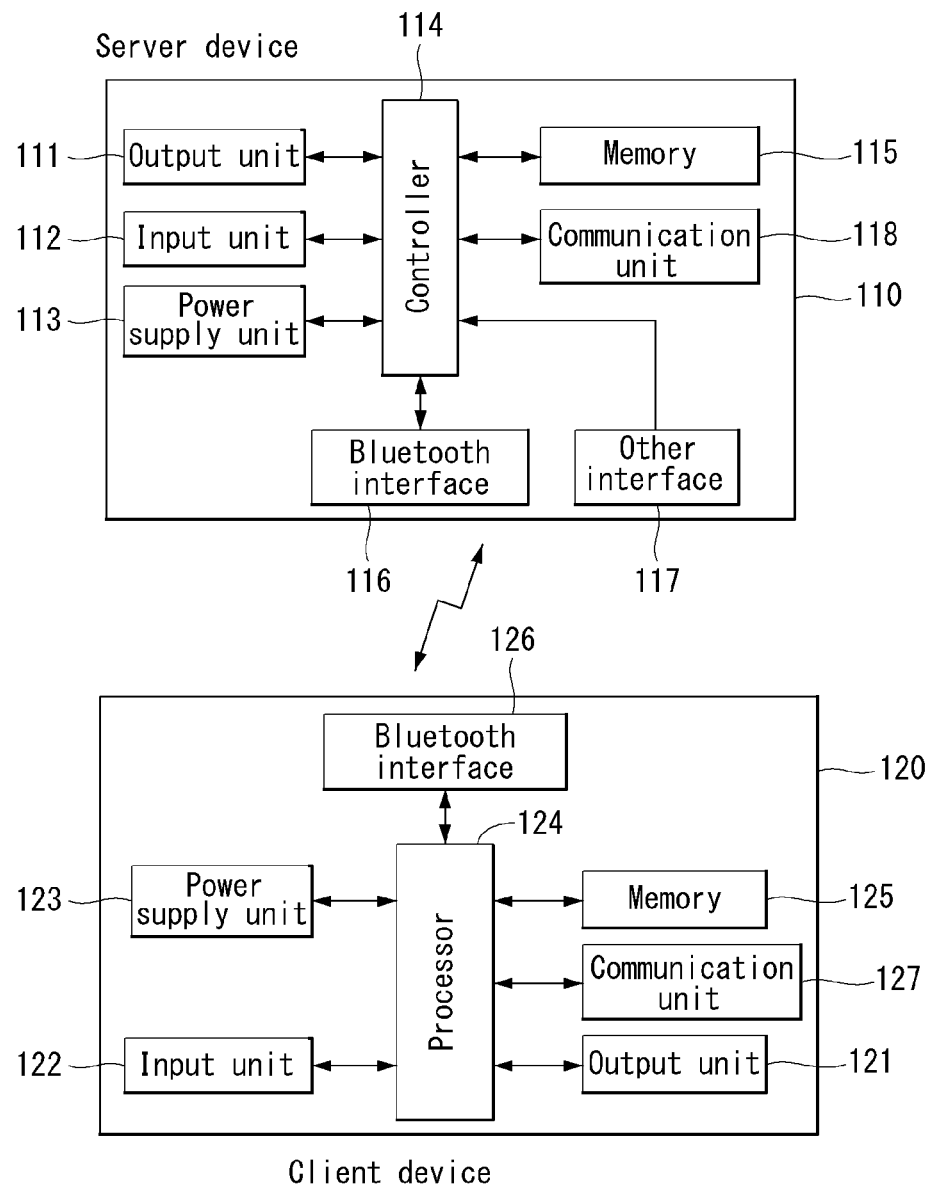

[FIG. 3]
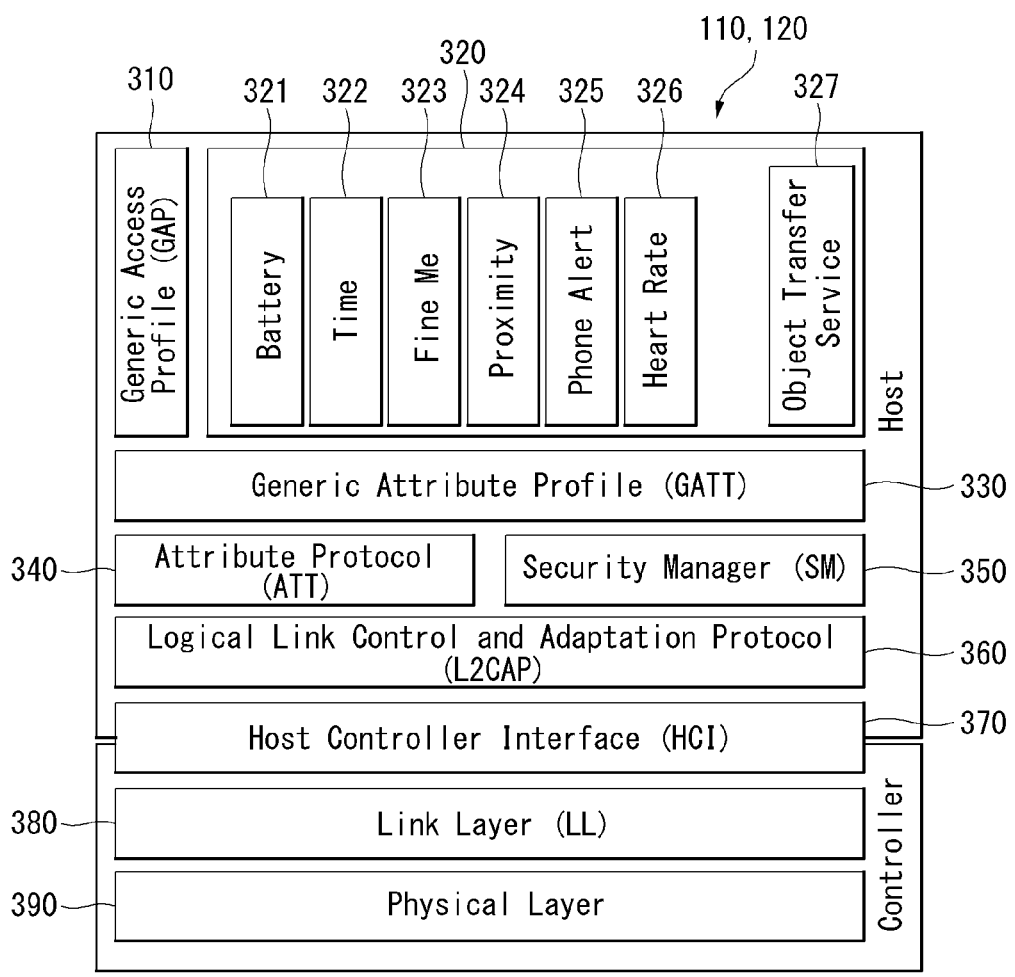

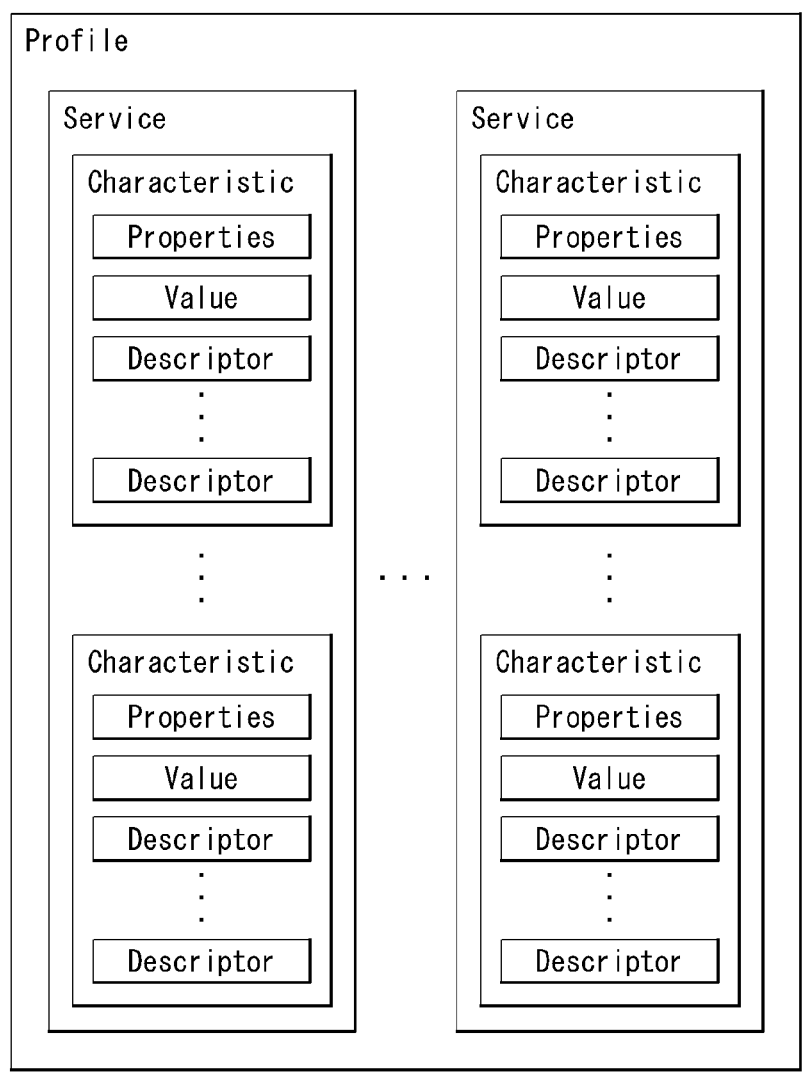
[FIG. 4]

[FIG. 5]
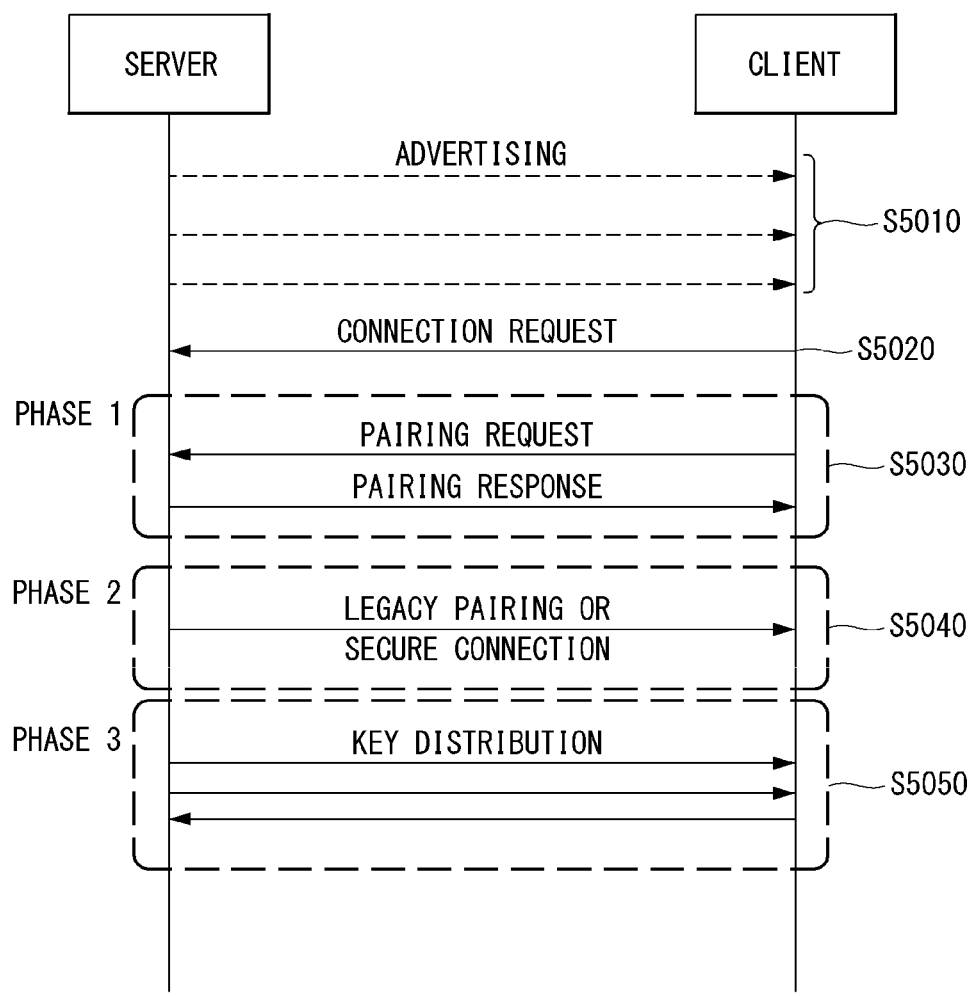

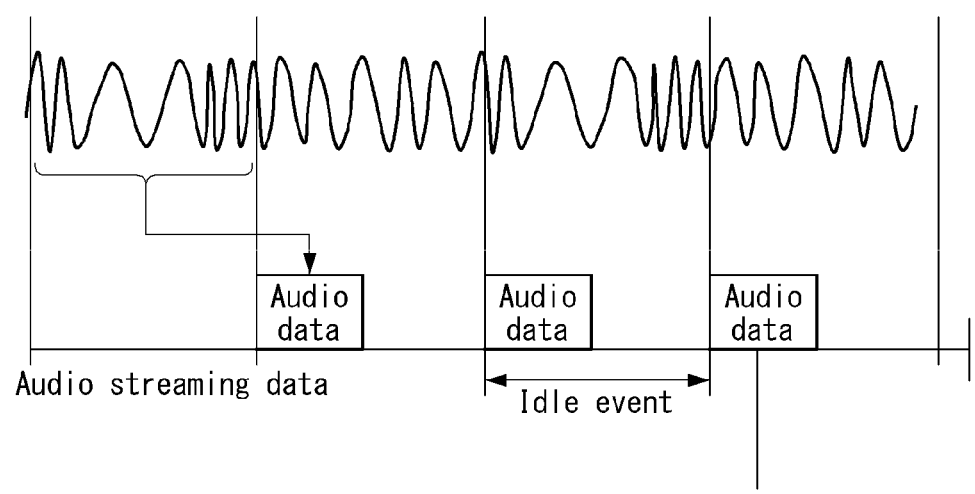
[FIG. 6]

[FIG. 7]
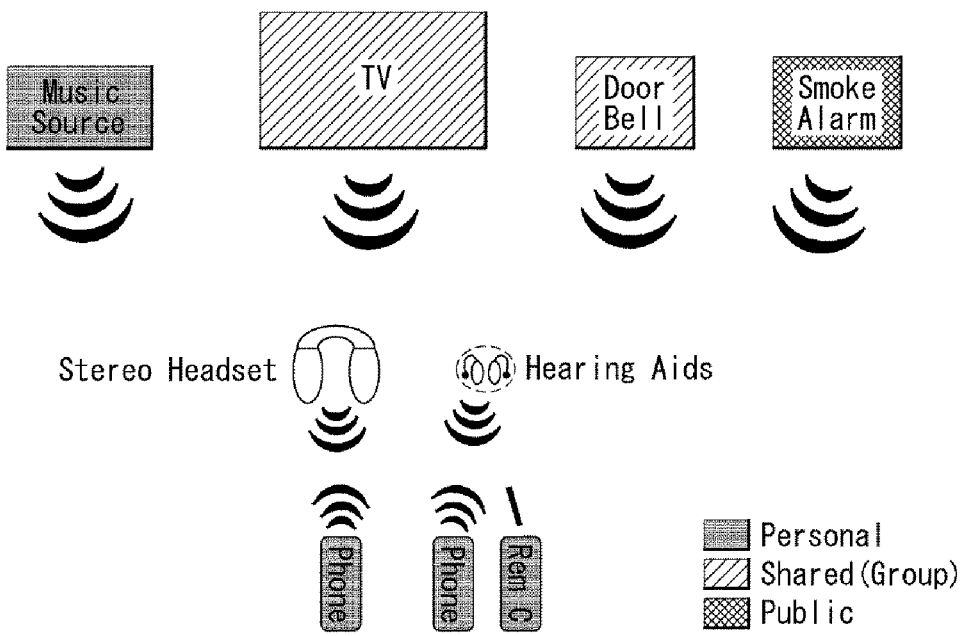

[FIG. 8]
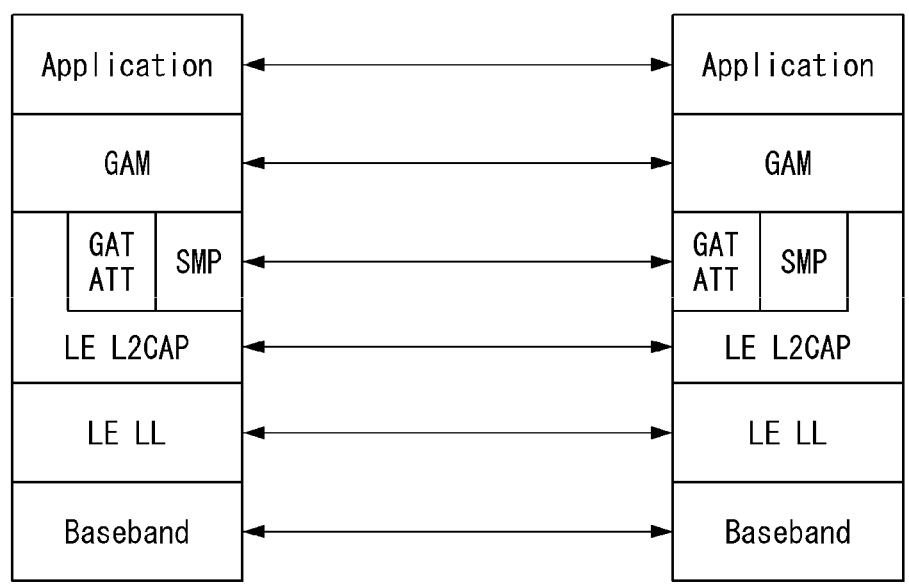

[FIG. 9]
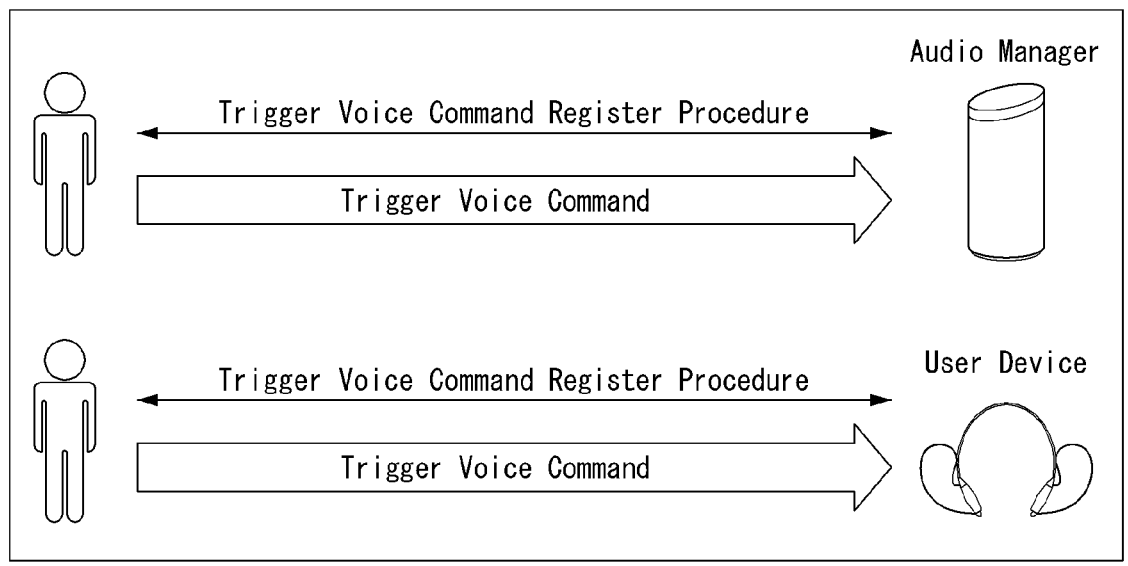
(a)
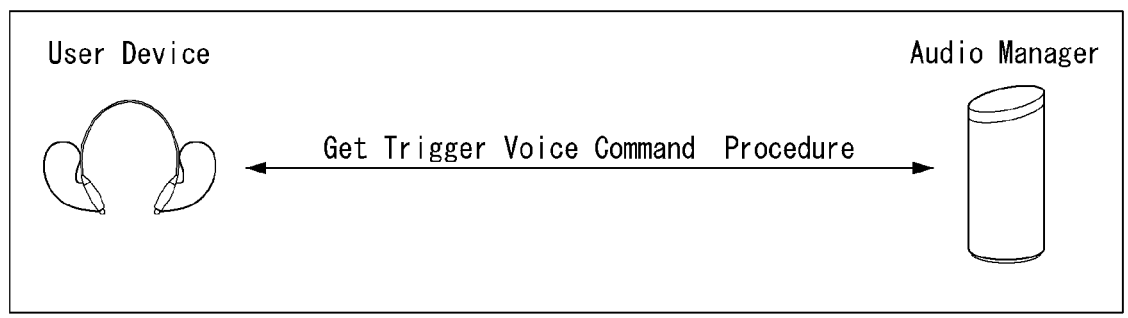
(b)

[FIG. 10]
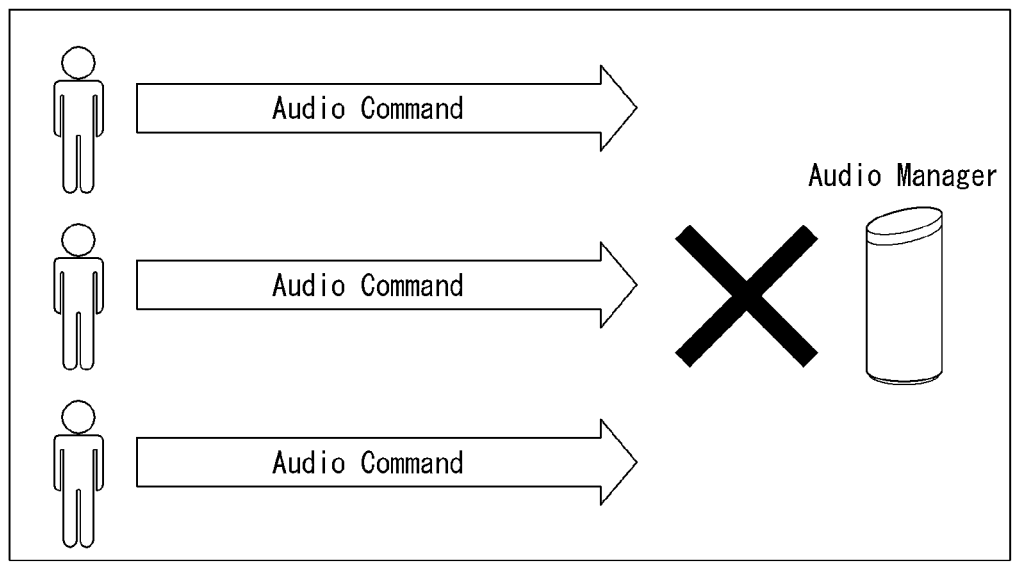
(a)
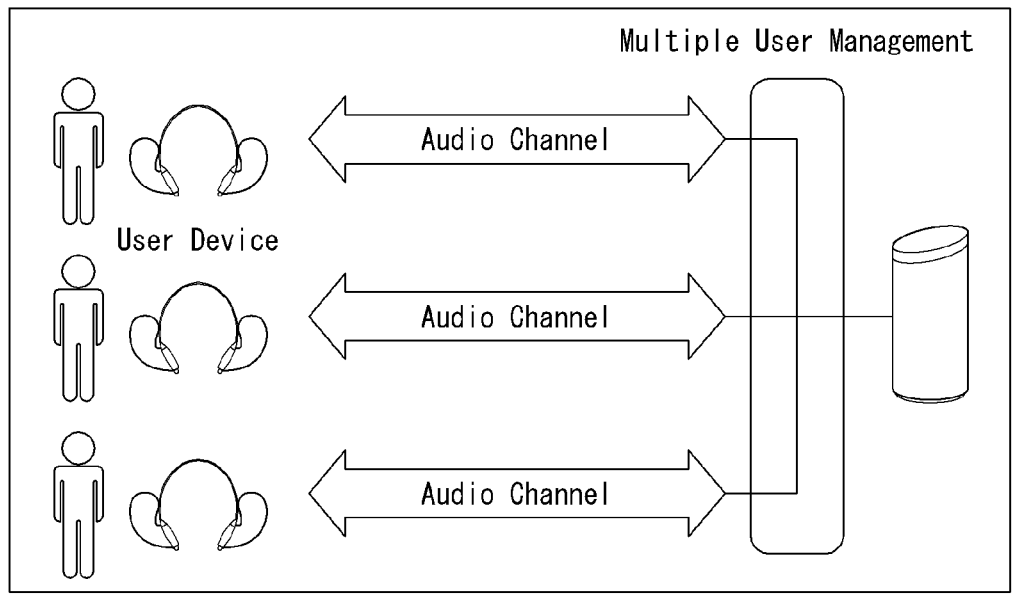
(b)

[FIG. 11]
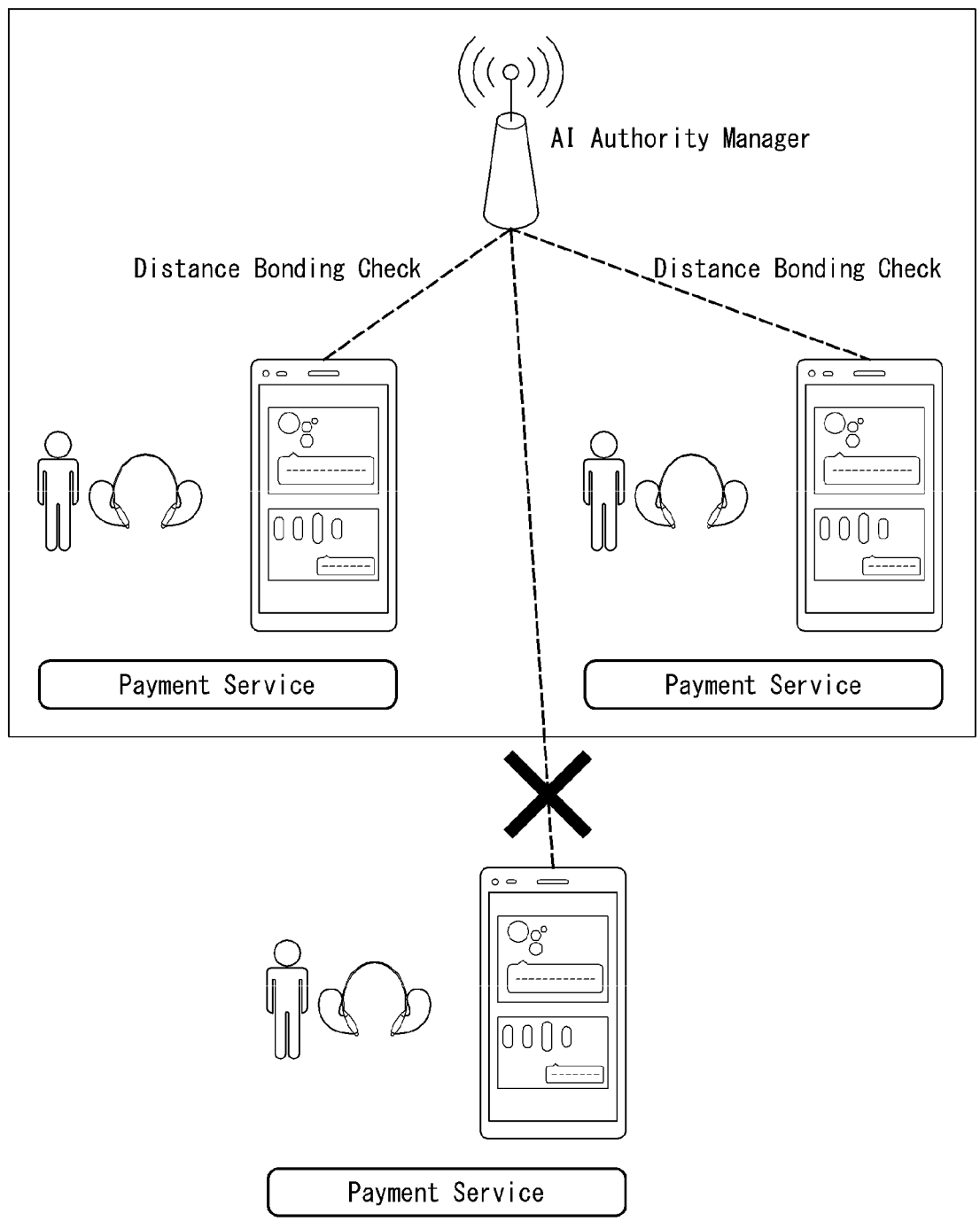

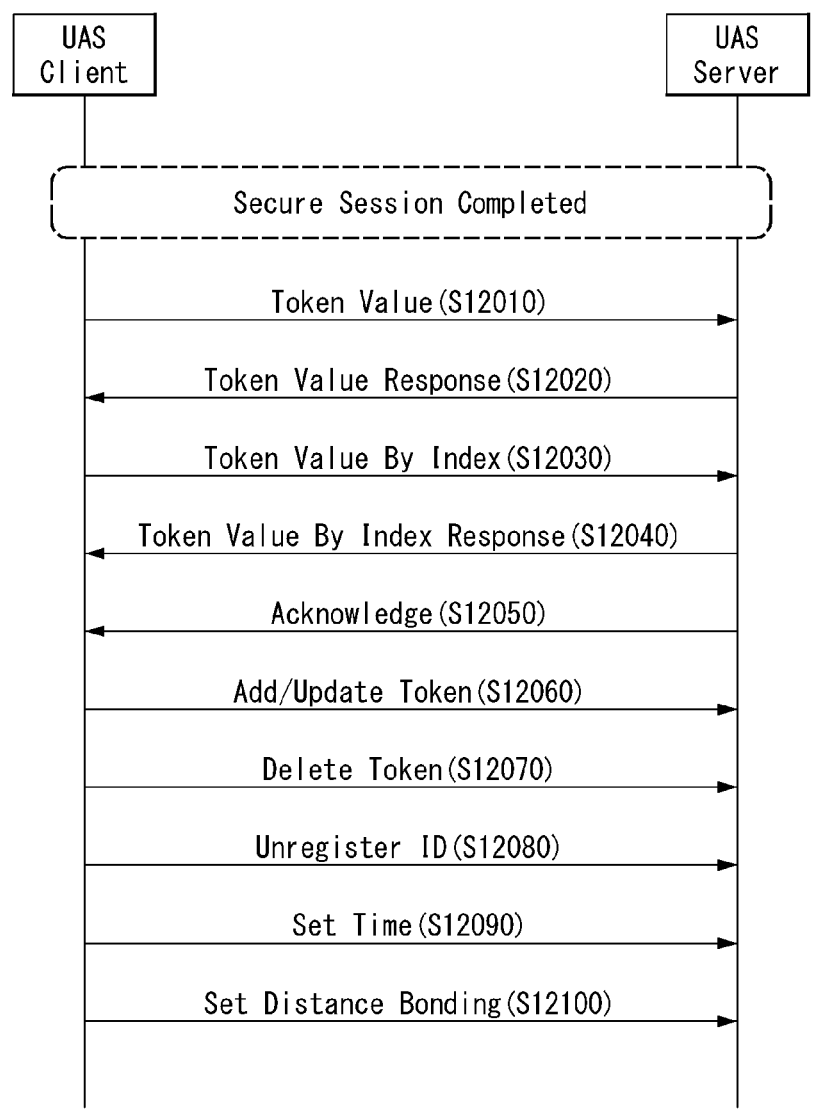

[FIG. 13]
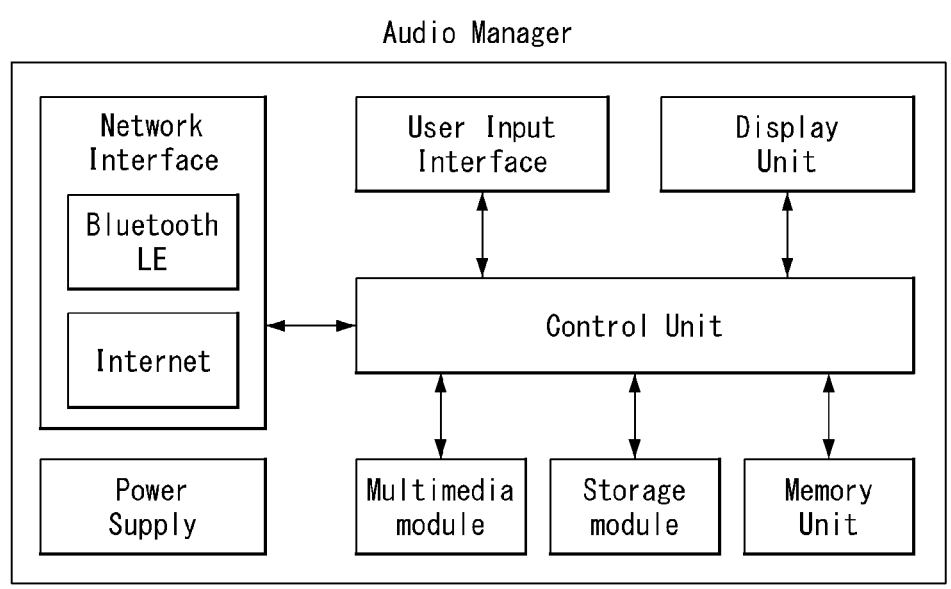

[FIG. 14]
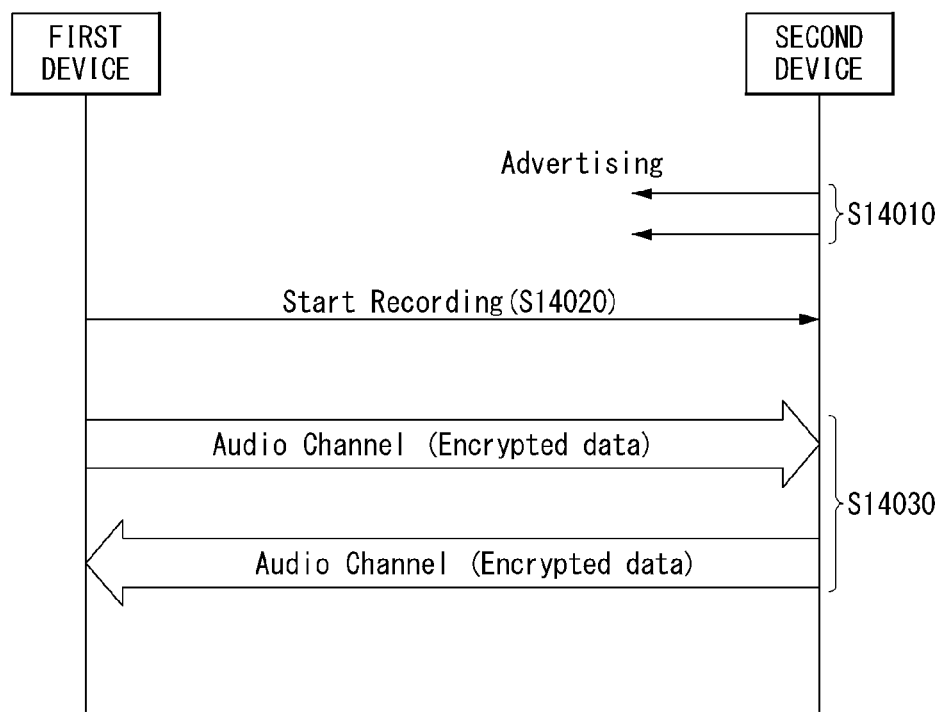

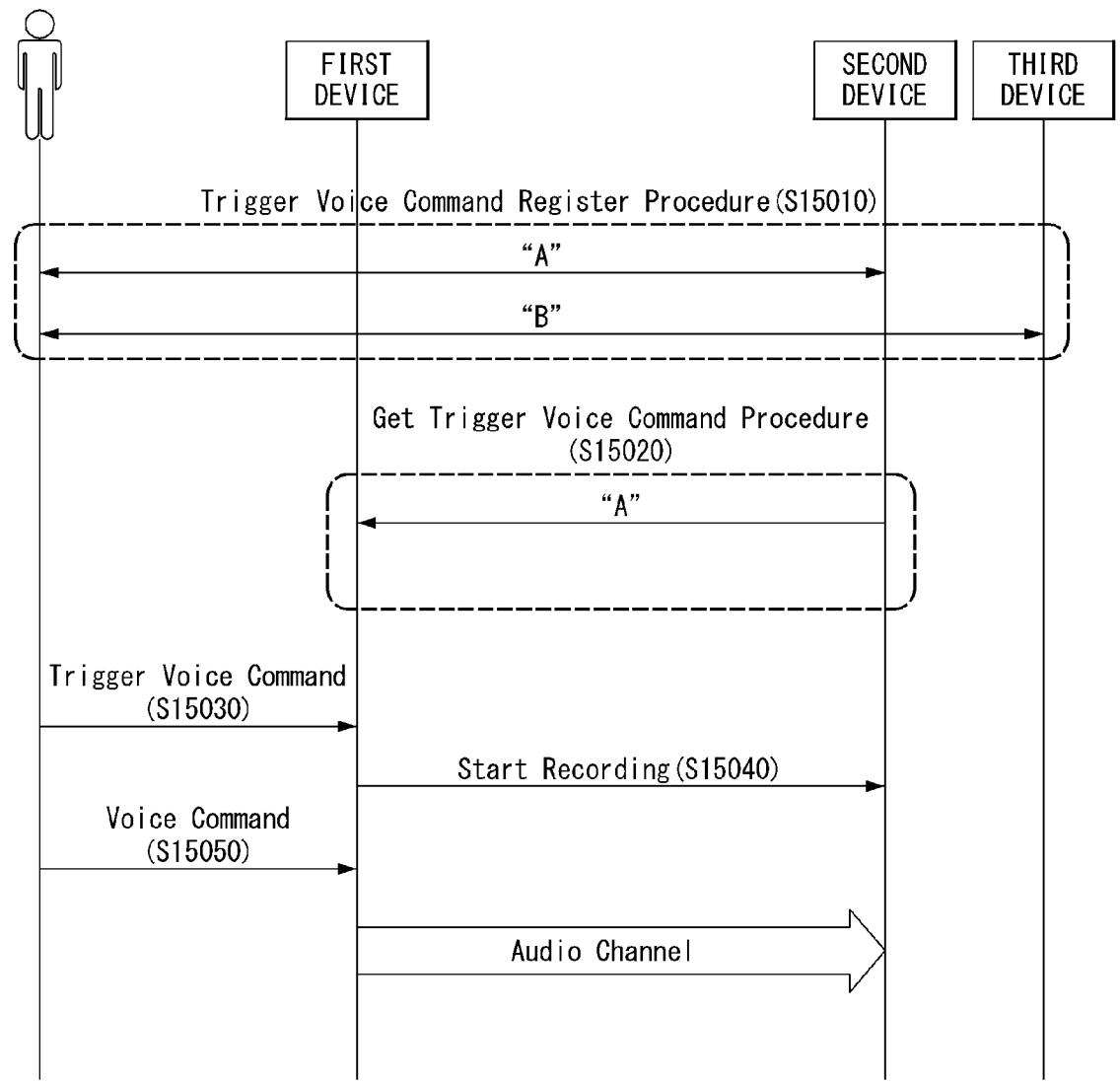
[FIG. 15]

[FIG. 16]
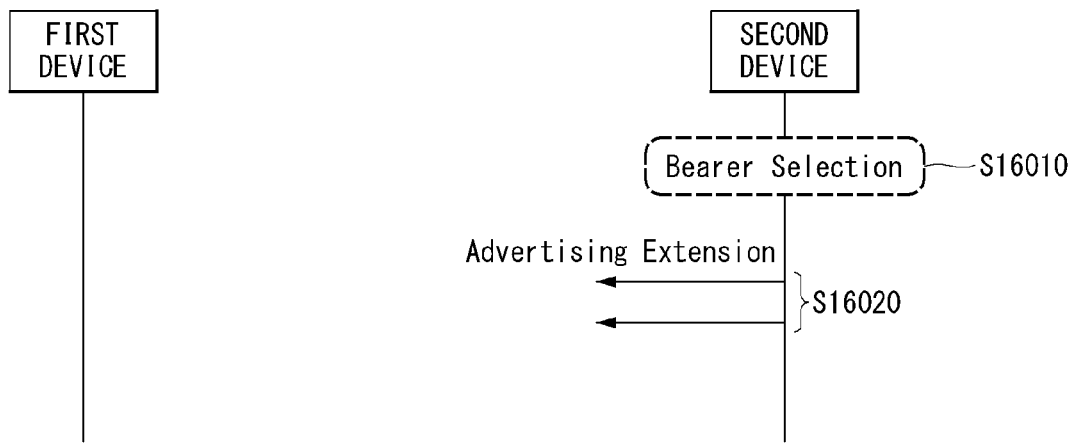
(a)
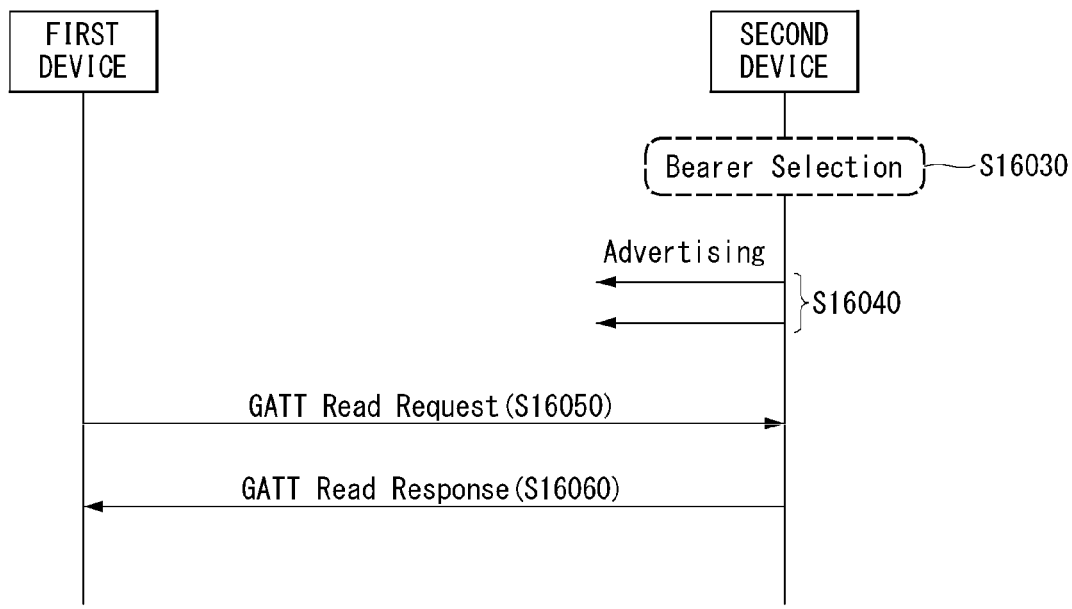
(b)

[FIG. 17]
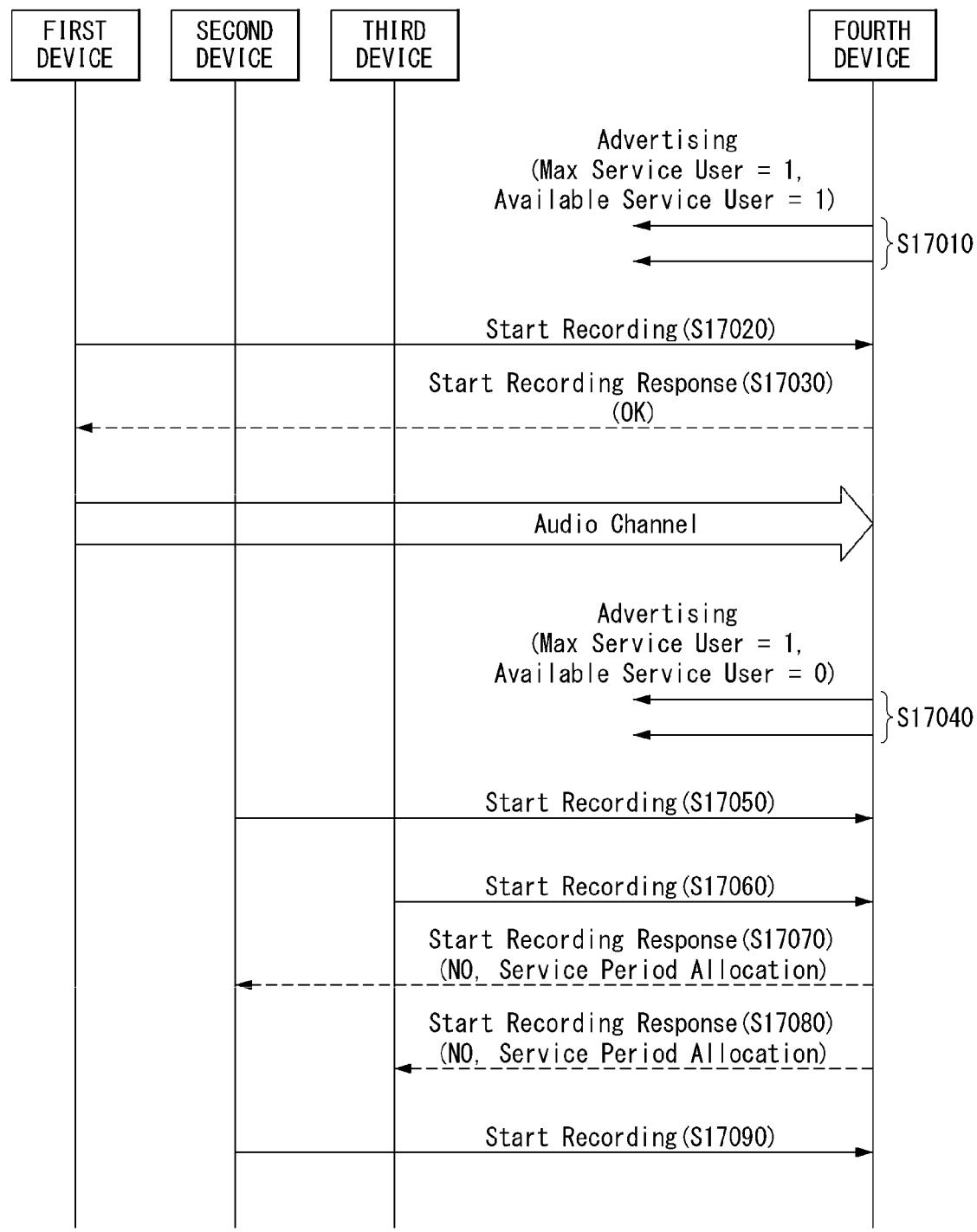

[FIG. 18]
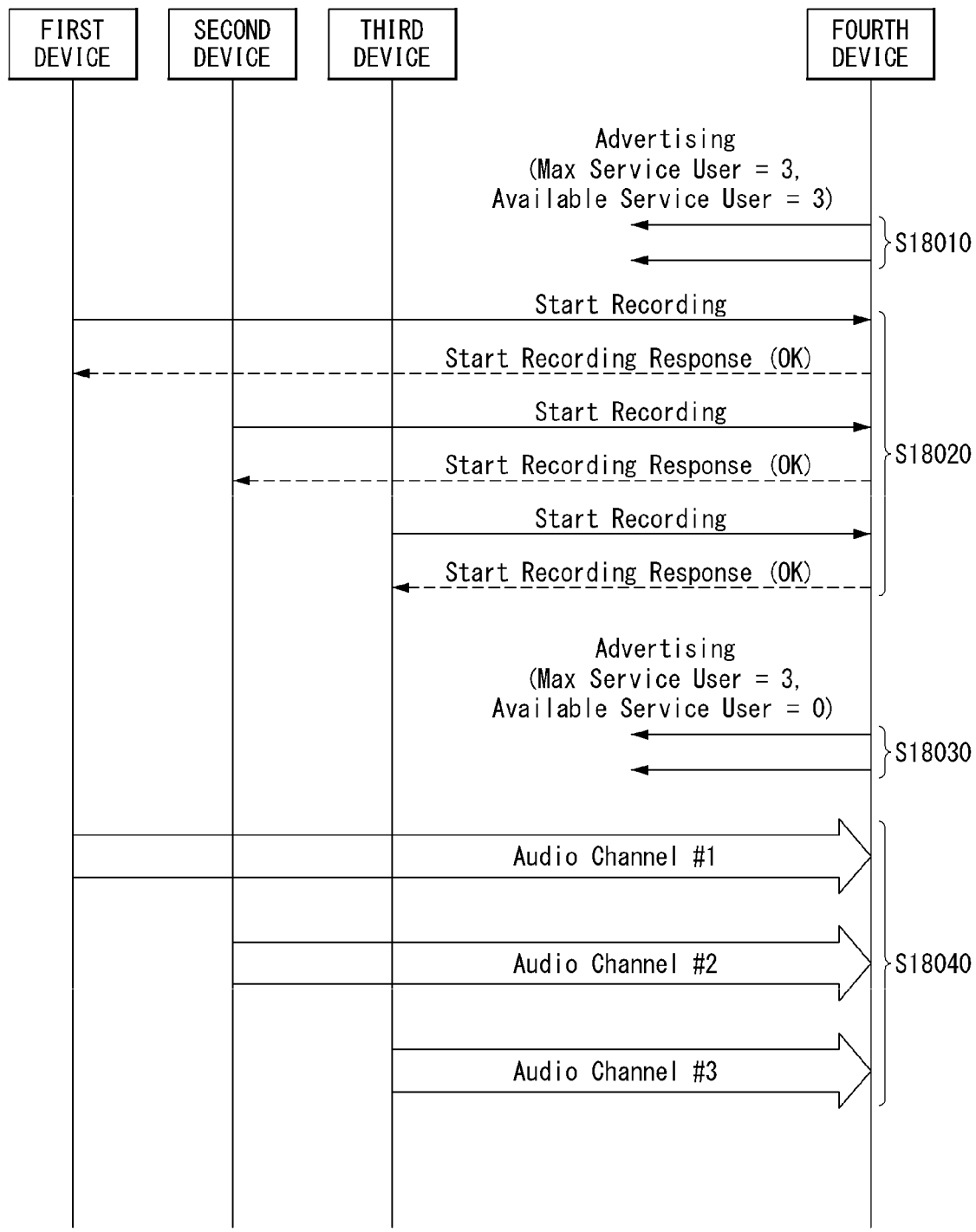

[FIG. 19]
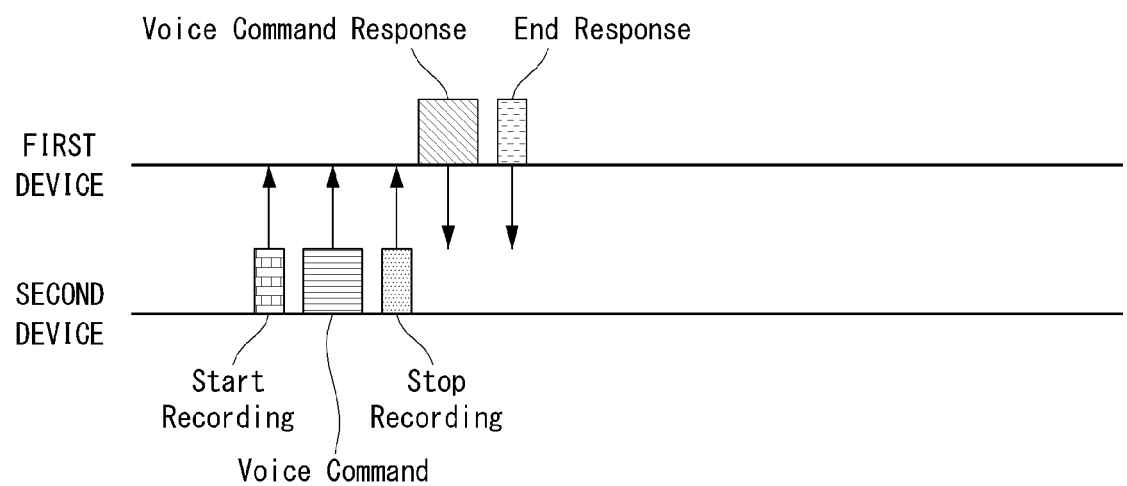

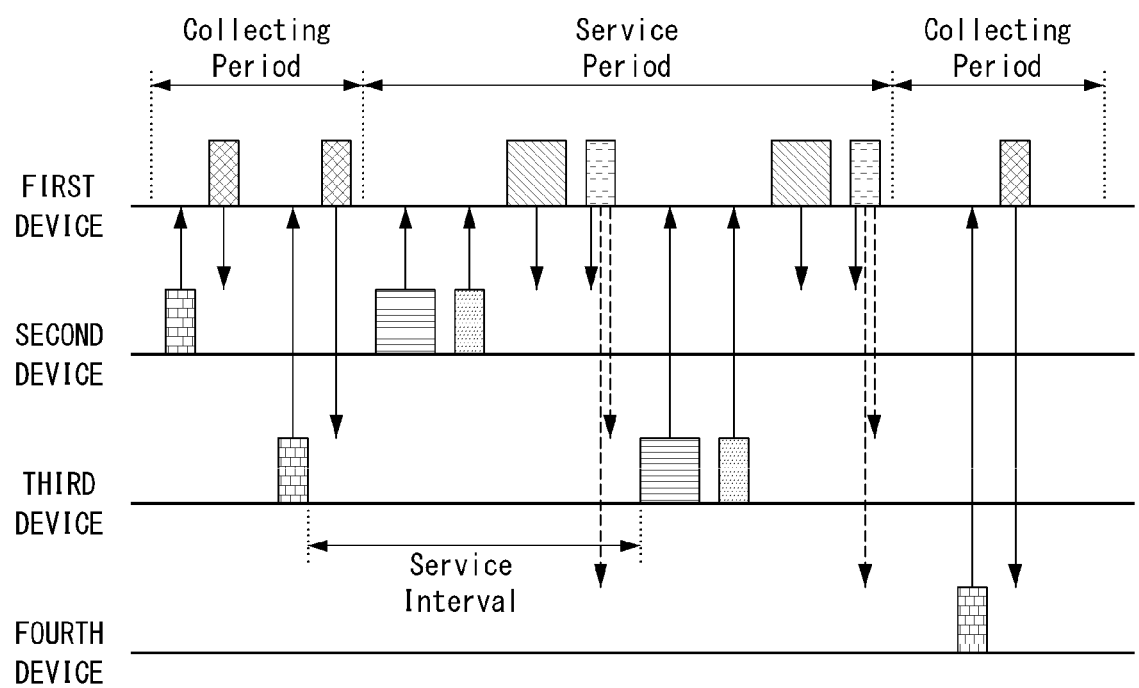
[FIG. 20]

[FIG. 21]
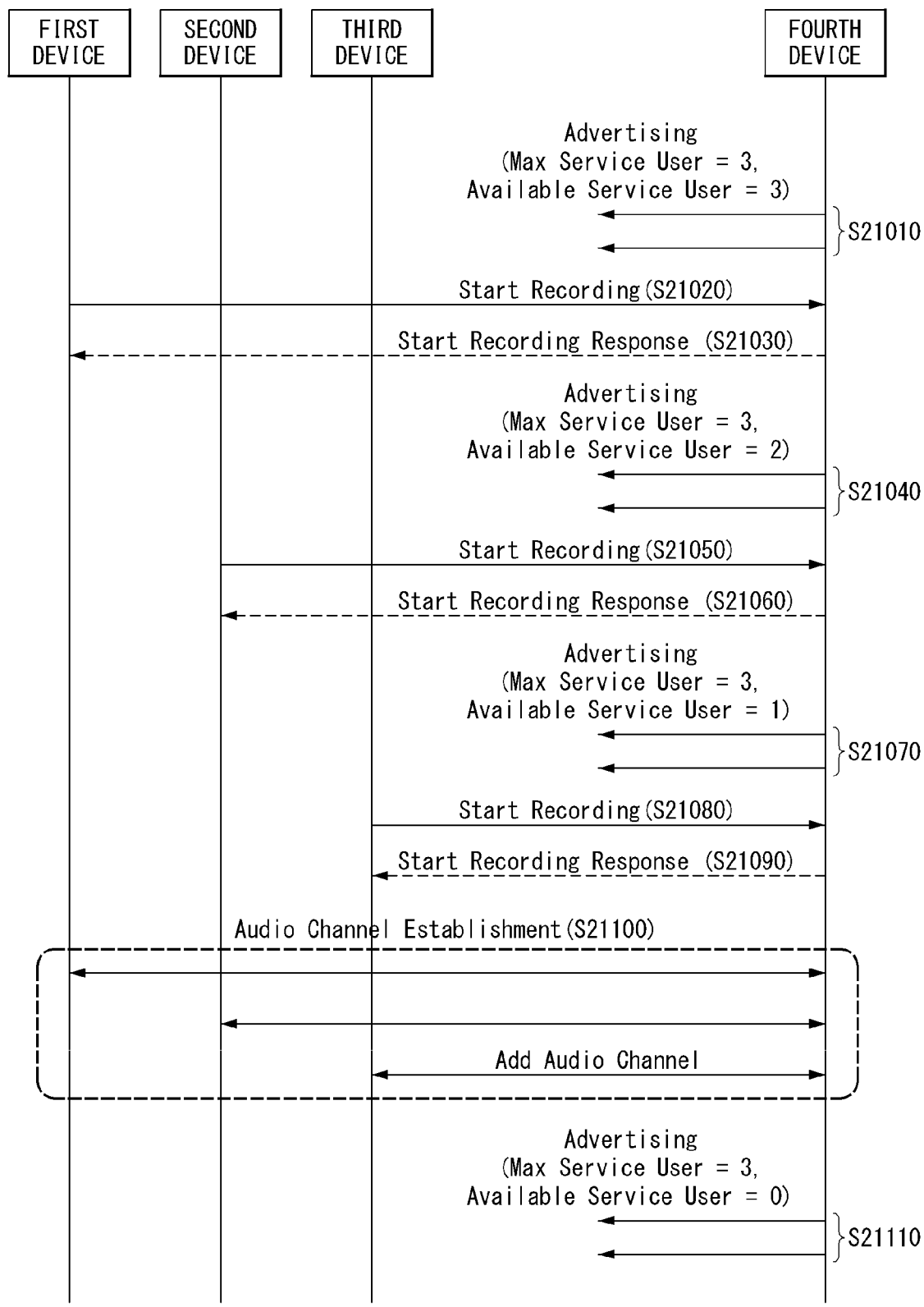

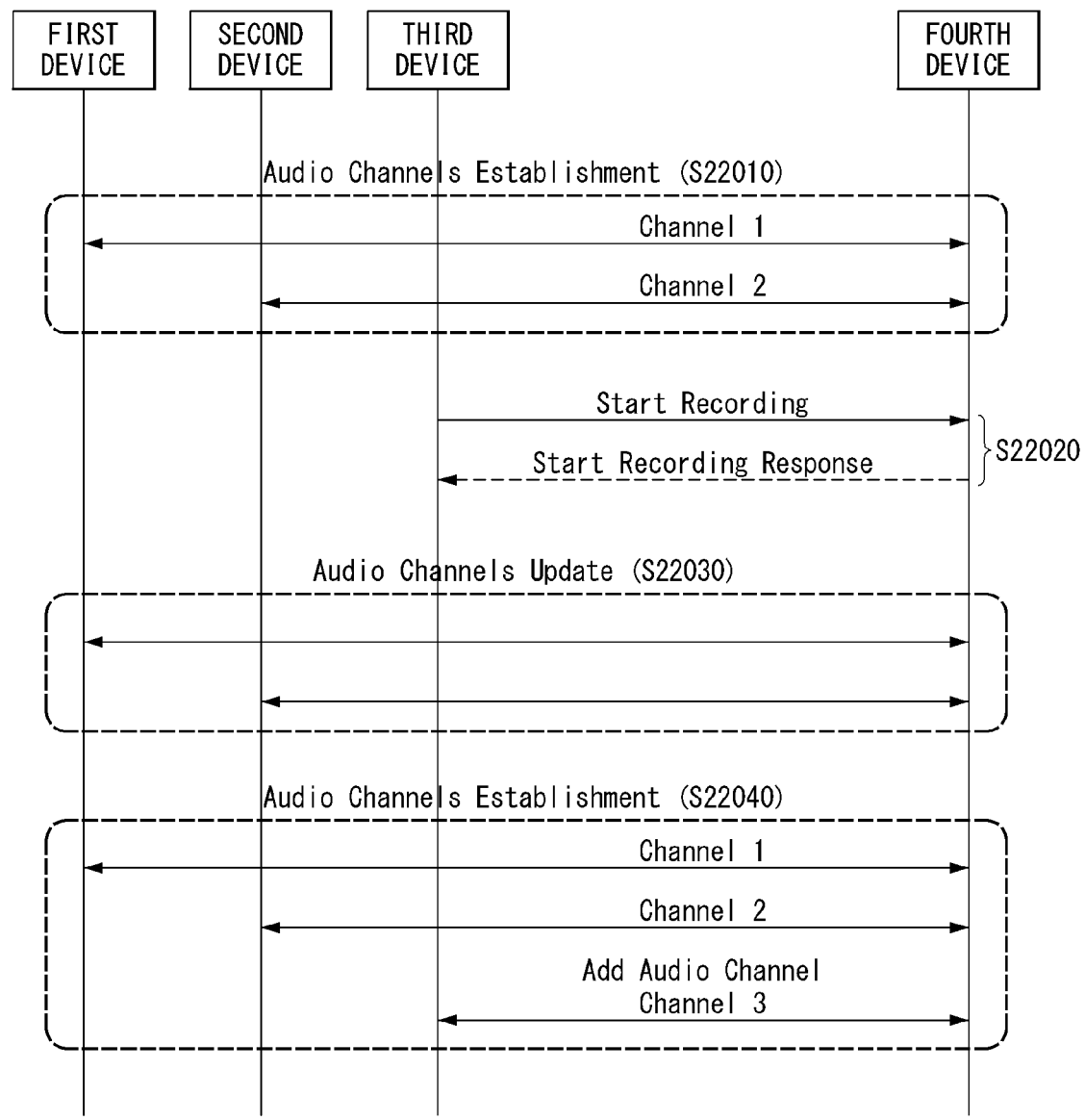
[FIG. 22]

[FIG. 23]
ICO Stream Anchor Point
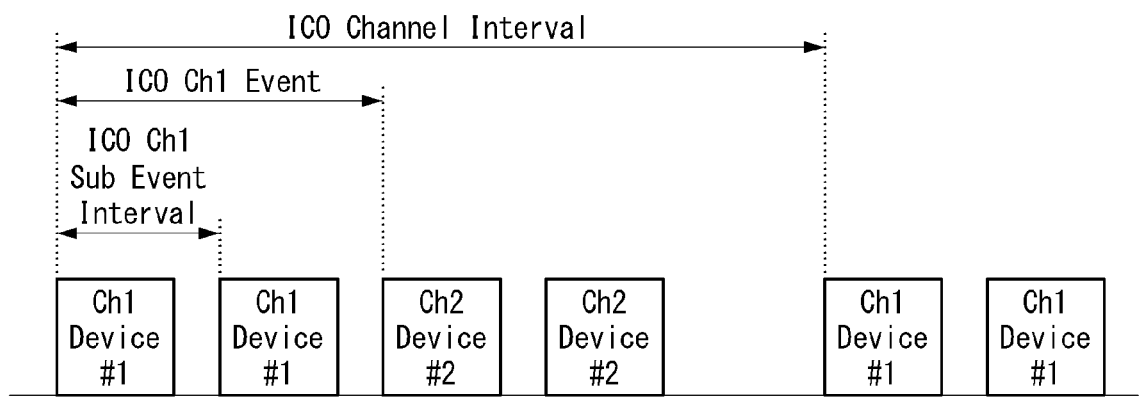
(a)
ICO Stream Anchor Point
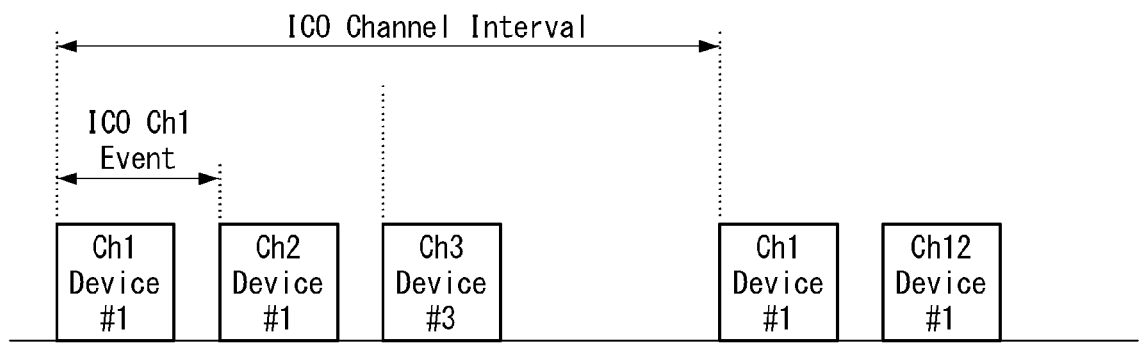
(b)

[FIG. 24]
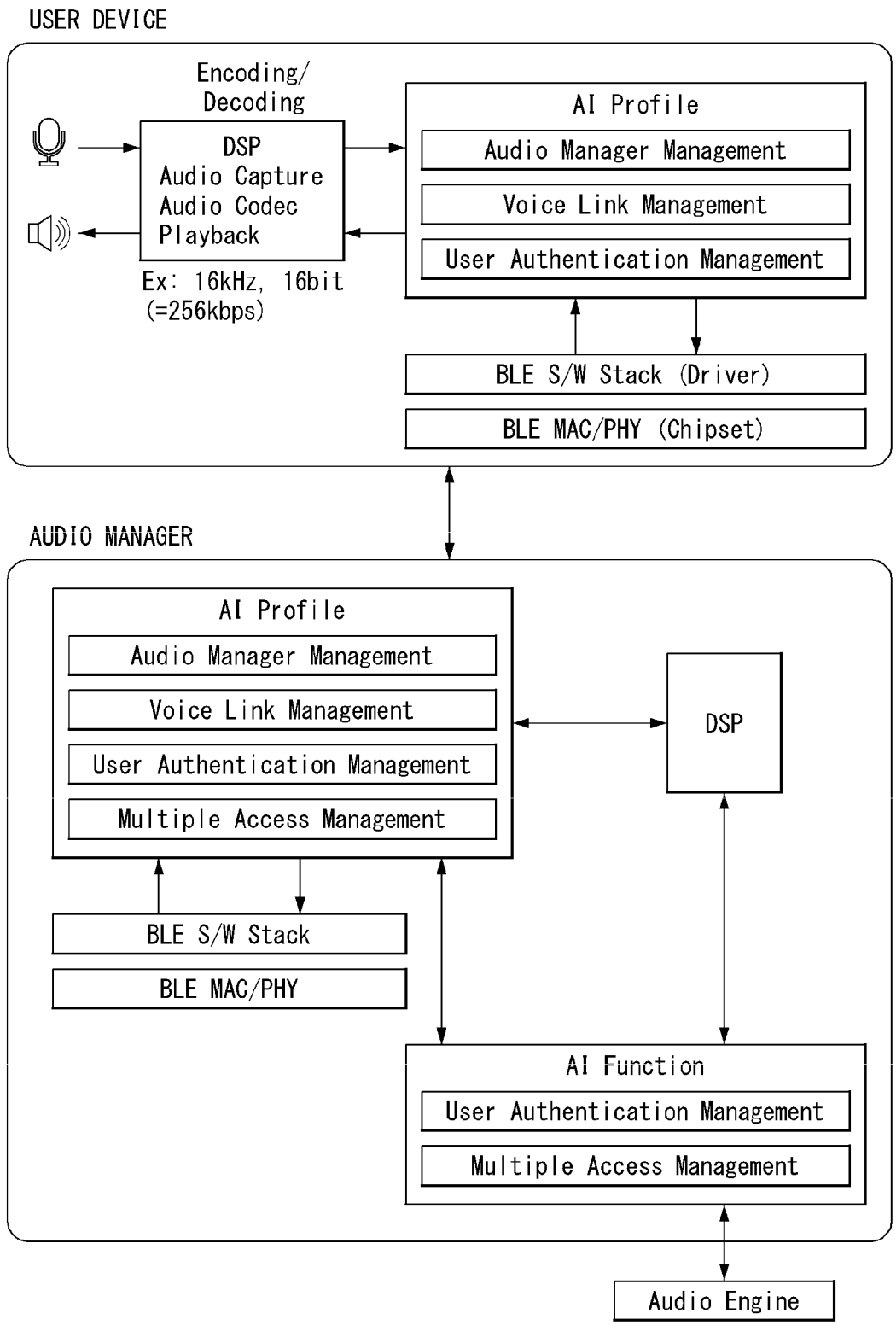

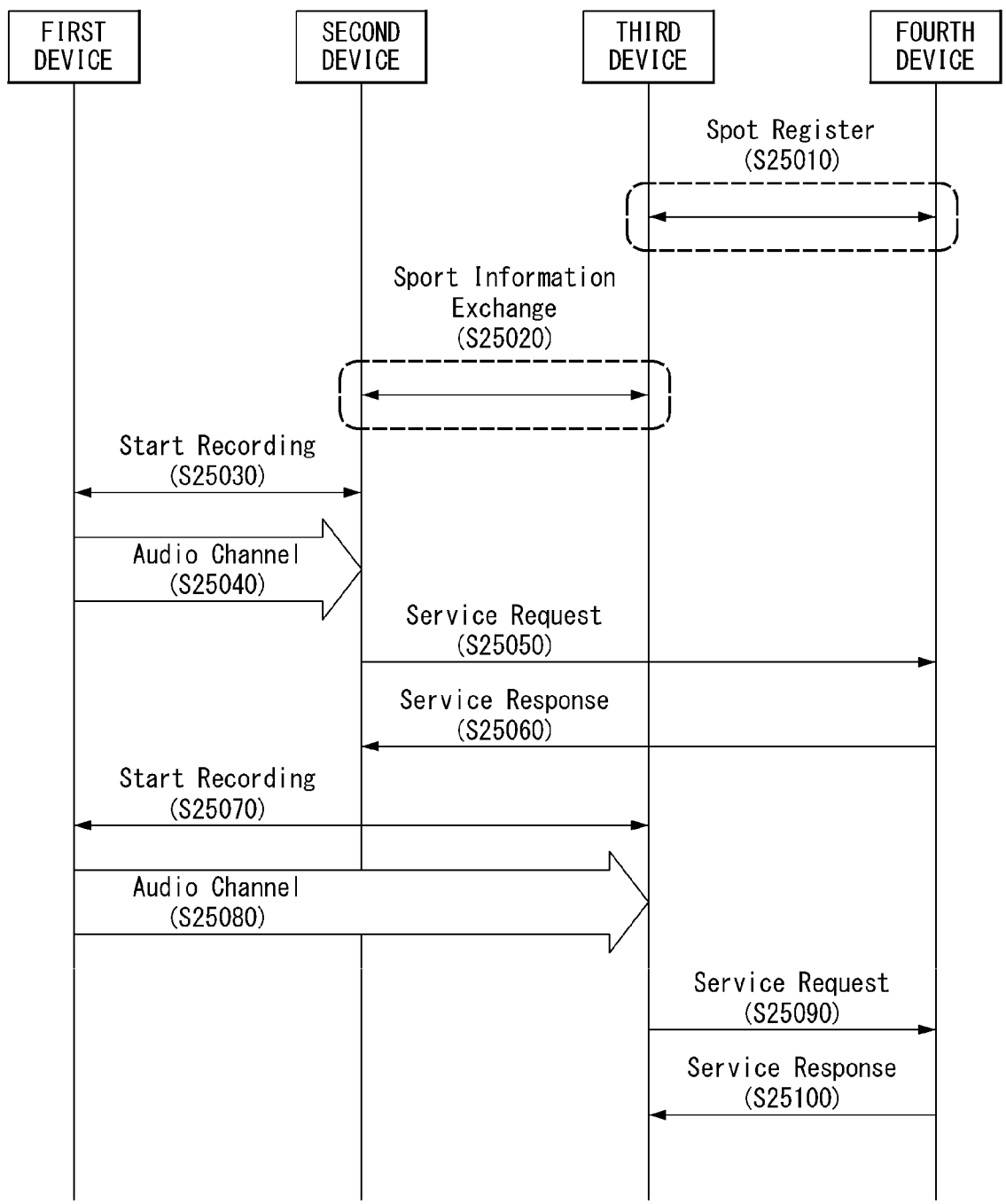
[FIG. 25]

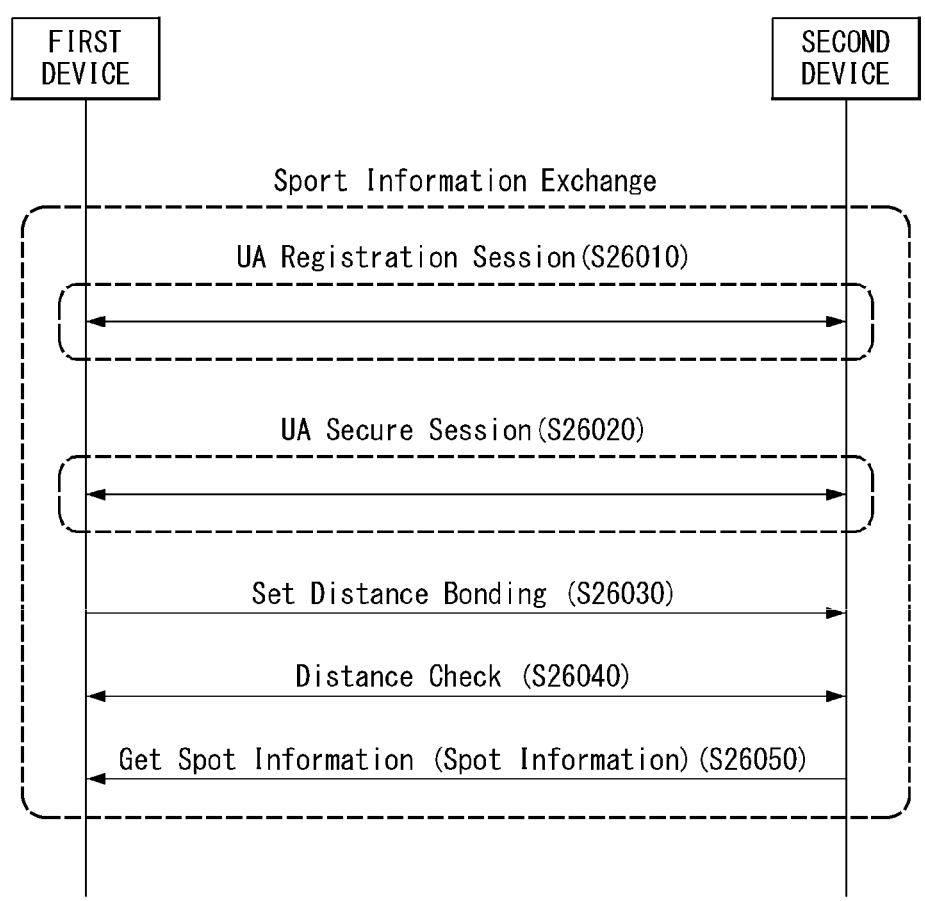

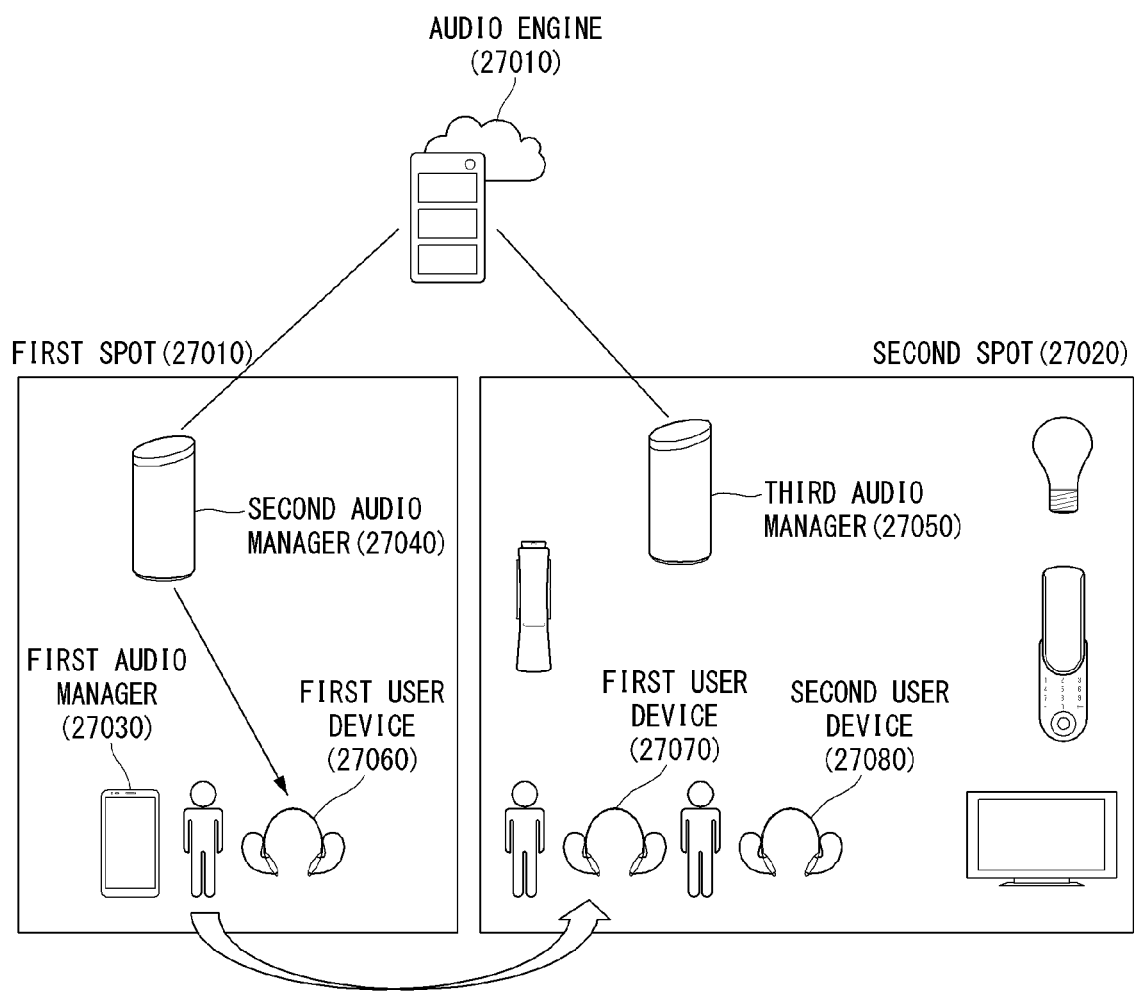

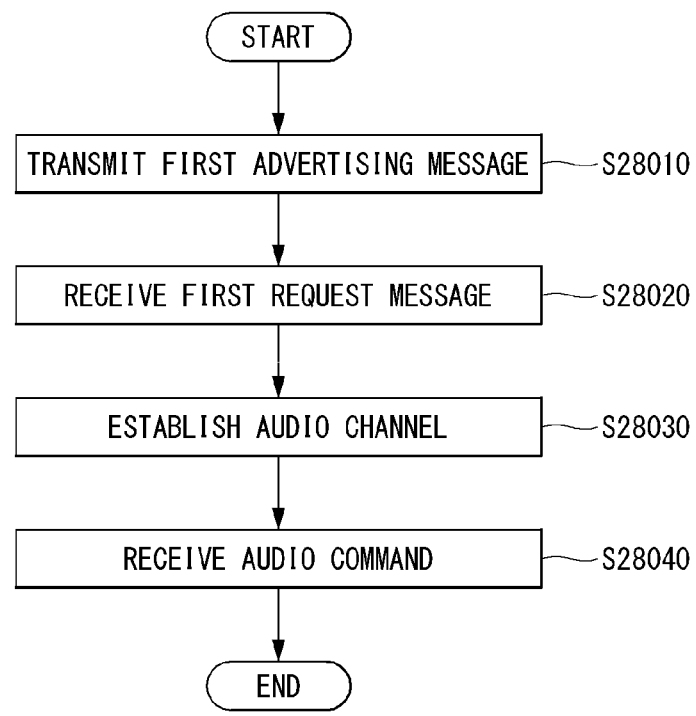
[FIG. 28]

METHOD AND APPARATUS FOR PROCESSING AUDIO SIGNAL BY USING BLUETOOTH TECHNOLOGY

CROSS REFERENCE TO RELATED APPLICATIONS

This application is the National Phase of PCT International Application No. PCT/KR2018/003194, filed on Mar. 19, 2018, which claims priority under 35 U.S.C. 119(e) to U.S. Provisional Application No. 62/472,603, filed on Mar. 17, 2017, all of which are hereby expressly incorporated by reference into the present application.

TECHNICAL FIELD

The present disclosure relates to a method and apparatus for processing an audio signal using Bluetooth, which is a short-range technology, in a wireless communication system, and more particularly, to a method and apparatus for processing audio commands requested from a plurality of users using Bluetooth technology.

BACKGROUND ART

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

DISCLOSURE

Technical Problem

An embodiment of the present disclosure provides a method and apparatus for transmitting an audio signal using Bluetooth technology.

Furthermore, an embodiment of the present disclosure provides a protocol for sharing a voice command between devices so that the devices enter a state capable of receiving an audio signal.

Furthermore, an embodiment of the present disclosure provides a method for processing audio commands requested from a plurality of users.

Furthermore, an embodiment of the present disclosure provides a method for granting service authority to a device at a specific location for secure connection.

Objects of the present disclosure are not limited to the above-mentioned objects. That is, other objects that are not mentioned may be obviously understood by those skilled in the art to which the present disclosure pertains from the following description.

Technical Solution

In this specification, a method for processing a voice command received from at least one device using a Bluetooth low energy technology, the method performed by a first device includes: transmitting a first advertising message to a peripheral device; receiving a first request message requesting establishment of an audio channel for transmitting and receiving the voice command from a second device; establishing the audio channel with the second device; and receiving a voice command instructing performance of a particular service from the second device through the audio channel.

Furthermore, the first advertising message may include a public key of the first device, the first request message may include a public key of the second device, and an audio command received through the audio channel may be encrypted using the public key of the first device.

Furthermore, the method may further include: transmitting a trigger command registered in the first device to the second device, in which the trigger command may indicate a voice command which causes the first device to enter a state capable of receiving a voice command.

Furthermore, the first request message may include the trigger command or information generated based on the trigger command.

Furthermore, the transmitting of the trigger command may include selecting a bearer for transmitting the trigger command from advertising extension, advertising, or GATT, and the trigger command may be transmitted to the second device using the selected bearer.

Furthermore, the first advertising message may include a maximum service user parameter indicating the maximum number of manageable user devices or an available service user parameter indicating the number of currently available user devices.

Furthermore, the method may further include: receiving a second request message requesting establishment of an audio channel for transmitting and receiving the voice command from a third device; and transmitting to the third device a first response message including an accept or reject intention determined based on values of the maximum service user parameter or the available service user parameter to the third device in response to the second request message.

Furthermore, the first request message and the second request message may be received during a collecting period for receiving a request of a voice recognition service of a plurality of users, and the voice command instructing performance of the particular service may be received during a service period for transmitting and receiving a voice command.

Furthermore, the service period may be divided and allocated to the second device and the third device.

Furthermore, the establishing of the audio channel may include establishing the audio channel with the third device, and a channel interval of the audio channel may include a first channel event allocated to the second device and a second channel event allocated to the third device.

Furthermore, the audio channel may be an isochronous channel.

Furthermore, the method may further include: exchanging location information with the second device, in which in the establishing of the audio channel, an audio channel may be established with the second device based on an available service policy determined depending on the location of the second device.

Furthermore, the location information may include a received signal strength indication (RSSI) or a window setting parameter.

In this specification, a first device for processing a voice command received from at least one device using a Bluetooth low energy technology includes: a communicator configured to communicate with an external device with a wired or wireless manner; and a processor configured to be functionally connected to the communicator, in which the processor may transmit a first advertising message to a peripheral device, receive a first request message requesting establishment of an audio channel for transmitting and receiving the voice command from a second device, establish the audio channel with the second device, and receive a voice command instructing performance of a particular service from the second device through the audio channel.

Advantageous Effects

The present disclosure has an advantage in that the voice recognition service may be provided through the transmission and reception of the voice data and the audio data.

Furthermore, the present disclosure has an advantage in that the user convenience may be increased by sharing the trigger voice command between the devices.

Furthermore, the present disclosure has an advantage in that the Bluetooth technology that does not perform sensing between the user devices may effectively handle the requests by the plurality of users.

Furthermore, the present disclosure has an advantage in that it is possible to provide the differentiated service depending on the user's location by granting the service authority to the device at the specific location for the secure connection.

Effects which can be achieved by the present disclosure are not limited to the above-mentioned effects. That is, other objects that are not mentioned may be obviously understood by those skilled in the art to which the present disclosure pertains from the following description.

DESCRIPTION OF DRAWINGS

FIG. 1 is a schematic view illustrating an example of a wireless communication system using a Bluetooth low energy technology to which the present invention is applicable.

FIG. 2 illustrates an example of an internal block diagram of a device capable of implementing methods proposed by this specification.

FIG. 3 illustrates an example of a Bluetooth communication architecture to which methods proposed by this specification may be applied.

FIG. 4 illustrates an example of a structure of a generic attribute profile (GATT) of Bluetooth low energy.

FIG. 5 is a flowchart showing an example of a connection procedure method in Bluetooth low energy technology to which the present invention may be applied.

FIG. 6 illustrates characteristics of an audio signal.

FIG. 7 illustrates an example of a home ecosystem for applications where an isochronous channel may be used.

FIG. 8 illustrates an example of a Generic Audio Middleware (GAM) protocol stack to which the present invention may be applied.

FIG. 9 is a diagram for describing a method for acquiring a trigger voice command according to an embodiment to which the present disclosure may be applied.

FIG. 10 is a diagram for describing a method for acquiring a trigger voice command according to an embodiment to which the present disclosure may be applied.

FIG. 11 is a diagram for describing a method for granting authority based on a location according to an embodiment to which the present disclosure may be applied.

FIG. 12 is a diagram illustrating a user authentication protocol depending on a distance according to an embodiment to which the present disclosure may be applied.

FIG. 13 is a diagram illustrating an example of an audio manager according to an embodiment of the present disclosure.

FIG. 14 is a flowchart for describing a method for transmitting and receiving an encrypted voice command according to an embodiment to which the present disclosure is applied.

FIG. 15 is a diagram illustrating a method for forming an audio channel through a procedure of acquiring a trigger voice command according to an embodiment to which the present disclosure is applied.

FIG. 16 is a diagram illustrating the procedure of acquiring the trigger voice command according to the embodiment to which the present disclosure is applied.

FIG. 17 is a flowchart illustrating a method for processing audio commands received from a plurality of user devices according to an embodiment to which the present disclosure is applied.

FIG. 18 is a flowchart illustrating a method for processing audio commands received from a plurality of user devices according to an embodiment to which the present disclosure is applied.

FIGS. 19 and 20 are diagrams for describing a process of transmitting and receiving an audio command according to a state of an audio manager according to an embodiment to which the present disclosure is applied.

FIG. 21 is a flowchart illustrating a method for processing audio commands received from a plurality of user devices according to an embodiment to which the present disclosure is applied.

FIGS. 22 and 23 are diagrams for describing a method for allocating audio channels for a plurality of user devices according to an embodiment to which the present disclosure is applied.

FIG. 24 is a diagram illustrating an example of an internal block diagram of a user device and an audio manager device according to an embodiment of the present disclosure.

FIG. 25 is a flowchart illustrating a method for acquiring service authority between an audio manager and an AI authority manager depending on a user's location according to an embodiment of the present disclosure.

FIG. 26 is a diagram illustrating an example of a method for exchanging location information between an authority manager and an audio manager according to an embodiment of the present disclosure.

FIG. 27 is a diagram illustrating an example of a usage environment according to an embodiment of the present disclosure.

FIG. 28 is a diagram illustrating an example of a method for processing a voice command according to an embodiment of the present disclosure.

MODE FOR INVENTION

In order to help understanding of the present invention, the accompanying drawings which are included as a part of the Detailed Description provide embodiments of the present invention and describe the technical features of the present invention together with the Detailed Description. Like reference numerals principally designate like elements throughout the specification. Further, in describing the present invention, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

Hereinafter, a method and an apparatus related with the present invention will be described in more detail with reference to drawings. In addition, a general term used in the present invention should be interpreted as defined in a dictionary or contextually, and should not be interpreted as an excessively reduced meaning. Further, a singular form used in the present specification may include a plural form if there is no clearly opposite meaning in the context. In the present application, a term such as "comprising" or "including" should not be interpreted as necessarily including all various components or various steps disclosed in the specification, and it should be interpreted that some component or some steps among them may not be included or additional components or steps may be further included. Suffixes "unit", "module", and "section" for components used in the following description are given or mixed in consideration of easy preparation of the specification only and do not have their own distinguished meanings or roles. The terms "first", "second", and the like are used to differentiate a certain component from other components, but the scope of should not be construed to be limited by the terms.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, a second device, etc.

The client device 110 may be expressed as a master device, a master, a client, a member, a sensor device, a sink device, a collector, a third device, a fourth device, etc.

The server device and the client device correspond to main components of the wireless communication system and the wireless communication system may include other components other than the server device and the client device.

The server device refers to a device that receives data from the client device, communicates directly with the client device, and provides data to the client device through a response when receiving a data request from the client device.

Further, the server device sends a notice/notification message and an indication message to the client device in order to provide data information to the client device. In addition, when the server device transmits the indication message to the client device, the server device receives a confirm message corresponding to the indication message from the client device.

Further, the server device may provide the data information to a user through a display unit or receive a request input from the user through a user input interface in the process of transmitting and receiving the notice, indication, and confirm messages to and from the client device.

In addition, the server device may read data from a memory unit or write new data in the corresponding memory unit in the process of transmitting and receiving the message to and from the client device.

Further, one server device may be connected to multiple client devices and may be easily reconnected to the client devices by using bonding information.

The client device 120 refers to a device that requests the data information or data transmission to the server device.

The client device receives the data from the server device through the notice message, the indication message, etc., and when receiving the indication message from the server device, the client device sends the confirm message in response to the indication message.

Similarly, the client device may also provide information to the user through the display unit or receive an input from the user through the user input interface in the process of transmitting and receiving the messages to and from the server device.

In addition, the client device may read data from the memory unit or write new data in the corresponding memory unit in the process of transmitting and receiving the message to and from the server device.

Hardware components such as the display unit, the user input interface, and the memory unit of the server device and the client device will be described in detail in FIG. 2.

Further, the wireless communication system may configure personal area networking (PAN) through Bluetooth technology. As an example, in the wireless communication system, a private piconet between the devices is established to rapidly and safely exchange files, documents, and the like.

FIG. 2 illustrates an example of an internal block diagram of a device capable of implementing methods proposed by this specification.

As shown in FIG. 2, the server device 110 includes a display unit 111, a user input interface 112, a power supply unit 113, a processor (or controller) 114, a memory unit 115, a Bluetooth interface 116, another interface 117, and a communication unit (or transmission/reception unit) 118.

The display unit 111, user input interface 112, power supply unit 113, processor 114, memory unit 115, Bluetooth interface 116, another interface 117, and communication unit 118 are functionally interconnected so as to perform a method according to an embodiment of the present invention.

Furthermore, the client device 120 includes a display unit 121, a user input interface 122, a power supply unit 123, a processor 124, a memory unit 125, a Bluetooth interface 126, and a communication unit (or transmission/reception unit) 127.

The display unit 121, user input interface 122, power supply unit 123, processor 124, memory unit 125, Bluetooth interface 126, and communication unit 127 are functionally interconnected so as to perform a method according to an embodiment of the present invention.

The Bluetooth interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored.

The processor 114, 124 refers to a module for controlling an overall operation of the server device 110 or the client device 120, and controls the server device or the client device in order in order to request the transmission of a message through the Bluetooth interface or other interface and to process a received message.

The processors 114 and 124 may be represented by a control section, a control unit, a controller, and the like.

The processors 114 and 124 may include an application-specific integrated circuit (ASIC), another chipset, a logic circuit, and/or a data processing device.

The processors 114 and 124 control the communication unit to receive an Advertising message from the server device 110, transmit a Scan Request message to the server device 110, control the communication unit to receive a Scan Response message from the server device 110 in response to the scan request, and control the communication unit to transmit a Connect Request message to the server device 110 in order to establish a Bluetooth connection with the server device 110.

In addition, after a Bluetooth LE connection is established through the connection procedure, the processors 114 and 124 control the communication unit so as to read or write data from or in the server device 110 using an attribute protocol.

The memory units 115 and 125 may include a read-only memory (ROM), a random access memory (RAM), a flash memory, a memory card, a storage medium, and/or other storage devices.

The communication units 118 and 127 may include a baseband circuit for processing a radio signal. When the embodiment is implemented by software, the aforementioned technique may be implemented by a module (a process, a function, and the like) that performs the aforementioned function. The module may be stored in the memory unit and executed by the processor.

The memory units 115 and 125 may be positioned inside or outside the processors 114 and 124 and connected with the processors 114 and 124 by various well-known means.

The display units 111 and 121 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by this specification may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth specification using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

1̂ Request and Response message: the Request message is used when a client device requests specific information from a server device, and the Response message is used in response to a Request message, which is transmitted from the server device to the client device.

2̂ Command message: The Command message is transmitted from a client device to a server device in order to indicate a command for a specific operation, but the server device does not send a response to a Command message to the client device.

3̂ Notification message: A server device sends this message to a client device in order to provide notification of an event, but the client device does not send a confirmation message to the server device in response to a Notification message.

4̂ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

1̂ Service: A combination of actions related to data, and it defines the basic operation of a device.

2̂ Include: Define a relationship between services.

3̂ Characteristics: A data value used by a service

4̂ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption can be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE specification, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner.

A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices can scan the discoverable device through an advertising (or broadcast) physical channel.

Both of the discovering device and the discoverable device may already have been connected to other Bluetooth devices in a piconet Connecting Procedure A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement.

After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning.

The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.

Initiating State

The link layer enters the initiating state in response to a command from a host (or stack).

In the initiating state, the link layer performs listening to advertising channel indices.

In the initiating state, the link layer listens to an advertising channel index for "scanWindow" duration.

Connection State

The link layer enters a connection state when the device performing the connection request, i. e., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave.

The master controls a timing of a connection event and the connection event refers to a time at which the master and the slave are synchronized.

Hereinafter, a packet defined the Bluetooth interface will be briefly described. BLE devices use packets defined below.

Packet Format

The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising Channel PDU

The advertising channel PDU includes a 16 bit header and a payload of various sizes.

The PDU type filed of an advertising channel included in the header supports PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: a connectable non-directional advertisement event

ADV_DIREC_IND: a connectable directional advertisement event

ADV_NONCONN_IND: a non-connectable non-directional advertisement event

ADV_SCAN_IND: a non-directional advertisement event that may be scanned

The PDUs are transmitted by the link layer in the advertising state and are received by the link layer in the scanning state or initiating state.

Scanning PDUs

The advertising channel PDU type below is called a scanning PDU and is used in the status described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDU

The data channel PDU may have a 16-bit header and various sizes of payloads and include a message integrity check (MIC) field.

The procedure, the state, the packet format, and the like in the BLE technology, which are described above, may be applied in order to perform methods proposed by this specification.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.

handle: Address of attribute
Type: Type of attribute
Value: Value of attribute
Permission: Access authority to attribute FIG. 5 is a flowchart showing an example of a connection procedure method in Bluetooth low power energy technology to which the present invention may be applied.

A server transmits to a client an advertising message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smart phone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertising message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.

Temporary Key: Key made for creating the STK

Short Term Key (LTK): Key value used for making encrypted connection between devices When the secure connection is performed in Phase 2, a 128-bit long term key (LTK) is generated.

Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Overview of Isochronous Channel

FIG. 6 shows characteristics of an audio signal.

As shown in FIG. 6, in the case of an audio signal, audio streaming data or audio data is periodically generated at an idle event interval.

Audio data is generated periodically (or at a specific time interval) according to the characteristics thereof.

In this case, the specific time interval during which audio data is periodically generated may be represented as an idle event interval.

Audio data is transmitted at an individual idle event interval.

Furthermore, individual audio data may be transmitted throughout part of or the entire event interval.

As shown in FIG. 6, when audio streaming data generated periodically or regularly is transmitted according to the BLE mechanism, an advertisement and scanning procedure, a communication procedure, and a disconnection procedure have to be performed whenever the generated audio data is transmitted or received.

As shown in FIG. 6, however, since audio data is generated at a regular interval for most cases, latency needs to be guaranteed with respect to the transmission of the audio data regardless of the amount of the audio data.

If the advertisement and scanning procedure, the communication procedure, and the disconnection procedure are performed whenever newly generated audio data is transmitted, however, a latency problem occurs during the transmission of the audio data.

If the BLE technology rather than the Bluetooth BE/EDR technology is used, high energy efficiency can be achieved because a relatively small amount of audio data is transmitted through an HA or headset. As described above, however, great overhead is generated because the data channel process of the BLE technology involves advertising, connection, etc. whenever data is transmitted. Accordingly, latency absolutely required for the transmission of audio data cannot be guaranteed.

Furthermore, the data channel process of the BLE technology involves sending intermittently generated data only when necessary, thereby improving energy efficiency by leading a BLE device in a different time region to deep sleep. Therefore, it may be difficult to apply the data channel process of the BLE technology to the transmission of audio data generated at a regular interval.

For such a reason, it is necessary to define a new mechanism in which periodically generated data, such as audio streams, is transmitted and received using the BLE technology.

In addition, since the operation of the link layer for transmitting an audio signal is not defined, the BLE has difficulty in transmitting an audio signal. Even if the audio signal is transmitted, a procedure for a user device (e.g., a headset, a phone, etc.) transmit the audio signal to a target device by discovering a device capable of receiving and processing the audio signal needs to be defined.

Thus, the present invention provides a procedure in which the user device may determine devices capable of recognizing and processing the audio signal of the user and transferring the processed audio signal to the target device in order to control the devices with the voice of the user.

Hereinafter, methods for transmitting and receiving periodically generated data (e.g., audio data, voice data, etc.) using the BLE technology will be described in detail.

That is, in the BLE technology, provided is a method for newly defining a channel for transmitting and receiving the periodically generated data and transmitting periodically generated data within a range that does not impair energy performance of the BLE by additionally defining a mechanism related to the newly defined channel.

Terms including audio stream data, audio data, audio streaming, audio stream, and the like may be interpreted as the same meaning.

Hereinafter, for convenience of understanding, it will be assumed that the terms are unified and used as the audio data.

Isochronous channel and definition of a mechanism related to isochronous channel A new channel, that is, an isochronous channel, is defined to send data generated at a regular interval using the BLE technology.

An isochronous channel is used to send isochronous data to devices using isochronous streams.

Isochronous data refers to data transmitted at a particular time interval, that is, periodically or regularly.

In other words, an isochronous channel may represent a channel for sending and receiving periodically generated data, such as audio data, in the BLE technology.

An isochronous channel may be used to send and receive audio data to and from a single member, three of one or more coordinated members, or a plurality of members.

Furthermore, an isochronous channel corresponds to an isochronous stream, such as an audio stream, or a flushing channel which may be used to send and receive important data in other time regions.

Methods using an isochronous channel described later are used independently of the advertising channel and data channel defined in the existing (v4.2 or earlier) BLE technology.

Furthermore, this document additionally defines a new frequency channel and frequency hopping interval for an isochronous channel.

An isochronous channel enables a conductor to send an isochronous stream such as flushable data (e.g., time-bound audio data) to one or more members using the BLE.

In this case, the conductor may be represented as a master, and the member may be represented as a slave.

Furthermore, an isochronous channel may or may not be configured by security setting.

Furthermore, an isochronous channel may be set up for various topologies to allow the transmission of an isochronous stream between a single conductor and a member, between a single conductor and a coordinated pair of members which generates a stereo audio stream, such as hearing aids or stereo headsets, and between a single conductor and a plurality of members synchronized with the same isochronous stream(s).

In this case, the member may send data to the conductor through an isochronous channel.

Furthermore, the isochronous channel may support the transmission and reception of shared audio, public audio, and broadcast audio as well as the transmission and reception of personal audio.

A procedure for setting up an isochronous channel requires that hierarchy of profile level security and reliability requirements satisfy use cases.

Furthermore, an isochronous channel may be used for various applications, by which a plurality of audio sources and sinks may be set up, and complicated topologies may be set up to allow users to regularly change or share different audio streams.

FIG. 7 illustrates an example of a home ecosystem for applications where an isochronous channel may be used.

That is, FIG. 7 illustrates an example of a space in which multiple audio conductors and members to which the methods proposed by this specification may be applied may move within or outside each other's area.

As illustrated in FIG. 7, the presence of various conductors and members may imply that the isochronous channel is needed as a method for informing the presence of a member so that the member may obtain information required for configuring the isochronous channel.

The isochronous channel may also be used for transmitting and receiving non audio data.

The member may use isochronous channels to determine whether there are notification messages that may include acquisition information from conductors within a BLE communication range.

Further, the member may use the isochronous channels to receive a request for control information or service data from one or one or more devices acting as a remote controller.

FIG. 8 illustrates an example of a Generic Audio Middleware (GAM) protocol stack to which the present invention may be applied.

An audio architecture including an Audio Middleware Layer may support unicast and broadcast audios using the BLE.

The audio middleware layer facilitates a transition between connections of audio application programs and may develop a more developed user case.

As illustrated in FIG. 8, by adding an audio middleware layer capable of accessing all audio profiles, the GAM may provide a smooth audio service to the user even in a dynamic and multi-profile environment. Since middleware may handle switching between audio mixing of various user cases and the user cases, each profile may concentrate on a specific function.

Since the GAM may support multiple profiles, the user may select an audio content range and an application program which may seamlessly move between voice operating devices.

The GAM defines announcements for the audio streaming and signal transmission for audio control and data transmission. An application layer defines application signaling and required transmission parameters.

In the existing Bluetooth low energy (hereinafter, BLE) technology, since an operation of a link layer for transmitting an audio signal is not defined, it is difficult to transmit an audio signal through BLE communication. In addition, in the BLE standard technology under discussion recently, the audio transmission is possible, but a procedure of causing a user's device (for example, a headset, a phone, and the like) to search for a device capable of receiving and processing an audio command, and transmitting the received audio command to the searched device is not defined.

In other words, in the existing BLE technology, when a user transmits his/her desired command to his/her own device by voice, a procedure of causing a device recognizing the voice to search for a device capable of processing the voice command and transmitting the processed voice command to the searched device is not defined.

Therefore, a procedure of causing a device recognizing a voice command from a user to search for a device capable of quickly processing the voice command and transmitting the voice command to the searched device needs to be defined. To this end, the present disclosure proposes a protocol for sharing a voice command between devices so that the devices enter a state capable of receiving an audio signal.

FIG. 9 is a diagram for describing a method for acquiring a trigger voice command according to an embodiment to which the present disclosure may be applied.

Referring to FIG. 9(a), a user may register a trigger voice command in a device through a trigger voice command register procedure.

In the present disclosure, the trigger voice command indicates a user's voice command which causes an audio manager to enter a state capable of receiving a voice command (or an audio command). The audio manager indicates a device capable of processing a voice command. In this case, the audio manager may be a device implemented to include a voice recognition engine or may be a device that communicates with the voice recognition engine in a wired or wireless manner. In this specification, the audio manager may be referred to as an audio engine, an audio gateway, a gateway, artificial intelligence (AI), or the like.

The user registers the trigger voice command through the trigger voice command registration procedure with the audio manager. If the trigger voice command registered in the audio manager is to be used even in the user device, the user similarly registers the trigger voice command through the trigger voice command registration procedure with the user device.

For example, if a trigger voice "A" is registered in a first audio manager, then the first audio manager may receive a voice command only when the voice "A" is input (or transmitted) to the audio manager before the voice command is transmitted. In addition, if a trigger voice "B" is registered in a second audio manager, then the second audio manager may receive the voice command only when the trigger voice "B" is input to the audio manager.

According to the existing BLE technology, in order for the user device to use the first audio manager and the second audio manager, the trigger voice A" needs to be registered in the first audio manager, the trigger voice "B" needs to be registered in the second audio manager, and the trigger voices "A" and "B" each need to be registered in the user device. In this case, the trigger voice command registration procedure with each device needs to be performed four times in total, which complicates the procedure and causes inconvenience to the user.

According to an embodiment of the present disclosure, as shown in FIG. 9(b), the user device may acquire a trigger voice command from the audio manager. Since the user device can directly acquire the trigger voice command from the audio manager without separately registering the user's trigger voice, the procedure can be simplified and the user convenience can be increased. In other words, the user device proposed herein can simplify the procedure by defining a protocol for acquiring the trigger voice from the audio manager.

When a plurality of users issues commands to one device capable of processing a voice command simultaneously or at small time intervals, a voice command processing device needs a method for efficiently processing the voice command.

FIG. 10 is a diagram for describing a method for acquiring a trigger voice command according to an embodiment to which the present disclosure may be applied.

Referring to FIG. 10(a), the existing audio manager is configured to receive and process an audio command (or voice command) from one user. Therefore, in a situation where a plurality of users want to issue commands to the audio manager, the plurality of users need to wait in consultation with each other. For example, when audio commands are received from a plurality of users under the environment where the audio command may be requested from the plurality of users like an airport, a restaurant, and the like, the plurality of users may experience inconvenience.

Accordingly, the present disclosure proposes a method for processing audio commands transmitted from a plurality of users in order to solve such a problem.

In the present specification, a user device includes a BLE module as a device that a user can carry, and may form an audio channel with an audio manager for transmitting an audio signal.

Also, an audio engine indicates a device capable of understanding and processing the meaning of a voice command. In general, the audio engine may be an audio engine server. When the audio manager does not have a function of directly interpreting the meaning of the voice command, that is, when the audio manager does not include the audio engine, the audio manager may request the audio engine to interpret or process the voice command.

In this specification, the audio channel indicates a channel capable of exchanging (or transmitting/receiving) voice data (or audio signal) using the BLE technology.

Referring to FIG. 10(b), the audio manager may effectively process the audio commands received from the plurality of user devices through the method proposed in this specification.

The existing AI does not provide differentiated services depending on where the user is.

However, under the environment where a service specialized for a location is required depending on a location to which a user belongs, when a user owns a device capable of processing a voice command with a personal device, a procedure of identify where each user is located to grant a user accessible (or executable) authority only to a specific location.

Therefore, the present disclosure proposes a method for granting service authority to a device at a specific location for secure connection.

FIG. 11 is a diagram for describing a method for granting authority based on a location according to an embodiment to which the present disclosure may be applied.

The present disclosure proposes a method for acquiring service authority between an audio manager and an AI authority manager depending on a user's location.

Referring to FIG. 11, the AI authority manager may check a distance from user devices and determine whether to grant authority thereto. Here, both the AI authority manager and the user devices may be an audio manager capable of processing a voice command.

In this case, the user device may be an audio manager in the form of an independent device, or may be an audio manager driven as software in a device, such as a smart phone, a headset, and handsfree, owned by the user.

In addition, the AI authority manager is a device that can determine where the device is, and a device that implements a protocol for notifying the surrounding audio manager of the corresponding location information.

The AI authority manager may grant access authority to users who belong to a specific location only at a specific location by checking a distance from a user device to control the users to use services. According to the embodiment of the present disclosure, it is possible to provide differentiated services depending on the user's location.

At this time, the AI authority manager may check the distance from the user device through a distance bonding check procedure. The distance bonding check procedure will be described with reference to the drawings below.

FIG. 12 is a diagram illustrating a user authentication protocol depending on a distance according to an embodiment to which the present disclosure may be applied.

Referring to FIG. 12, a set distance bonding operation may be added to a Secure Get/Put operation so that authentication can be performed only within a predetermined distance by acquiring (or calculating and estimating) a distance between a user authentication service (UAS) client and a UAS server.

Here, the secure get/put operation refers to a method for retrieving, adding, and deleting a token, and unregistering and updating an ID in the UAS server device. In this case, the token indicates a unique unit indicating the user authentication information.

In FIG. 12, the AI authority manager and the audio manager may each operate as a UAS client and a UAS server.

To initiate the Secure Get/Put operation (or procedure), the UAS client needs to complete a secure session beforehand. If an active registration ID is set in the secure session, the UAS client transmits a Secure Get message for token retrieval to the UAS server (S12010 and S12030), and the UAS server transmits a response message to each Secure Get message to the UAS client (S12020 and S1204).

In steps S12060 to S12090, the UAS client may transmit a message for retrieving, adding, and deleting a token, unregistering an ID, and setting a time from the UAS server device to the UAS server.

In particular, the UAS client may transmit the set distance bonding message to the UAS server (S12100). The set distance bonding message may include location information of the UAS client. The location information may be generated based on location information provided from the AI authority manager.

The AI authority manager and the audio manager can check proximity between devices using a UAS protocol. In this case, various known distance measuring methods (for example, received signal strength indication (RSSI)) may be used.

FIG. 13 is a diagram illustrating an example of an audio manager according to an embodiment of the present disclosure.

Referring to FIG. 13, a device implemented as an audio manager may include a display unit, a user input interface, a power supply unit, a control unit (or a processor), and a memory unit, a network interface, a storage, and a multimedia module. The network interface may include a BLE interface and an internet interface, and may include a communication unit capable of communicating with an external device in a wired or wireless manner.

Each configuration included in the audio manager may perform the same function as the configurations (configuration of a server device or a client device) described above with reference to FIG. 2.

The BLE interface of the audio device may exchange (or transmit and receive) an audio command (or an audio signal) with the BLE interface of the user device. In addition, the BLE interface of the audio device may exchange a control command with the BLE interface of the control device.

In addition, the BLE interface of the audio device may exchange information related to handover with an audio engine. As described above, the audio device may be implemented by including the audio engine therein, or may be implemented to communicate with an external audio engine in a wired or wireless manner.

In addition, the internet interface of the audio device may request the audio engine to interpret the audio command and receive a response thereto.

FIG. 14 is a flowchart for describing a method for transmitting and receiving an encrypted voice command according to an embodiment to which the present disclosure is applied.

Referring to FIG. 14, the first device may be a user device and the second device may be an audio manager device.

The second device transmits an advertising message to peripheral devices (S14010). The advertising message may include a public key of the second device.

The first device receiving the advertising message transmits a start recording message to the second device (S14020). Here, the start recording message refers to a message that causes the audio manager to enter a state capable of receiving an audio command (or audio signal). The start recording message may include the public key of the first device or the trigger voice command described above. Upon receiving the start recording message, the second device can receive the audio command. That is, when the second device receives the start recording message, an audio channel between the first device and the second device may be formed.

After the audio channel is established between the first device and the second device, the first device transmits an encrypted voice command using the public key of the audio manager, and the second device encrypts a voice command response message in response to the voice command received from the first device using the public key of the first device and transmits the encrypted voice command response message (S14030).

FIG. 15 is a diagram illustrating a method for forming an audio channel through a procedure of acquiring a trigger voice command according to an embodiment to which the present disclosure is applied.

Referring to FIG. 15, it is premised that the first device may be a user device and the second device and the third device may be an audio manager device. In this case, the user device may be, for example, a headset, a speaker, a handsfree, a smart phone, or the like.

When a user device uses a voice recognition service through several audio managers, a method for dividing and calling each voice recognition service is proposed.

In the embodiment of the present disclosure, in forming the audio channel with the audio manager, the user device may acquire a trigger voice command that a user registers in advance in the audio manager and call a voice recognition service to be used.

In detail, the user performs a trigger voice command registration procedure on the second device and the third device (S15010). The user may register a first trigger voice command (for example, A) in the second device and register a second trigger voice command (for example, B) in the third device. The second device or the third device waits for a subsequent voice command when the trigger voice command registered in each device is received.

The first device performs a procedure of acquiring a trigger voice command with the second device (S15020). Prior to performing the procedure of acquiring a voice command, a procedure of forming a BLE connection between the first device and the second device may be performed. In step S15020, the first device receives the first trigger voice command from the second device.

Thereafter, the first device receives the first trigger voice command from the user (S15030), and transmits the start recording message to the second device (S15040). For example, when the user speaks "A" around the first device, the first device may recognize the first trigger voice command and call the second device. This causes the second device to enter a state capable of receiving the subsequent voice command. That is, the audio channel is formed between the first device and the second device.

The first device receives the voice command from the user (S15050). The first device transmits the received voice command to the second device through the audio channel formed between the first device and the second device.

According to the embodiment of the disclosure, a user does not register, in a user device, the trigger voice command that causes a audio manager to individually enter a state capable of receiving an audio command, and may directly speak the trigger voice command to the user device to call the corresponding audio manager.

At this time, a procedure of the user device acquiring the trigger voice command from the audio manager will be described in detail with reference to the following drawings.

FIG. 16 is a diagram illustrating the procedure of acquiring the trigger voice command according to the embodiment to which the present disclosure is applied.

Referring to FIG. 16, it is assumed that the first device may be a user device and the second device may be an audio manager device.

According to the embodiment of the present disclosure, the audio manager may transmit information on the trigger voice command to the user device using an advertising extension bearer, and transmit the information on the trigger voice command to the user device using a GATT bearer.

In addition, the audio manager may select a bearer for the procedure of acquiring a trigger voice in the advertisement extension or the GATT in consideration of the interference environment or the implementation environment.

Specifically, referring to FIG. 16(a), the second device selects the bearer for transmitting the trigger voice command to the first device (S16010). If the advertisement extension is selected, the second device transmits the trigger voice command through the advertisement extension (S16020).

Specifically, referring to FIG. 16(b), the second device selects the bearer for transmitting the trigger voice command to the first device (S16030). If the GATT scheme is selected, the second device transmits the advertising message to the first device (S16040).

The first device transmits a GATT read request message requesting a trigger voice command to the second device (S16050). The second device transmits, to the first device, a GATT read response message including information on the trigger voice command in response to the GATT read request message (S16060).

The use of the advertisement extension can improve performance in relation to a collision between messages. In other words, there is an advantage in that a relatively easy collision avoidance design is possible. On the other hand, there may be a disadvantage in that the transmission and reception delay may be increased. In the situation where there is a lot of interference, it is more efficient to reduce a collision, so the use of the advertisement extension can efficiently acquire the trigger voice command.

On the other hand, in the situation where there is relatively little interference, it may be more efficient to use the GATT scheme instead of using the advertisement extension. Therefore, as in the above-described embodiment, when the bearer selection steps S16010 and S16030 are added and operated, the audio manager can more efficiently perform the trigger voice command procedure with the user device.

Hereinafter, a method of effectively processing audio commands received from a plurality of user devices will be described.

FIG. 17 is a flowchart illustrating a method for processing audio commands received from a plurality of user devices according to an embodiment to which the present disclosure is applied.

Referring to FIG. 17, a first device, a second device, and a third device may be a user device, and a fourth device may be an audio manager device.

Due to the time required to manage an audio channel and process an audio command (for example, processing an audio command performed between an audio manager and an audio engine), the number of user devices that the audio manager can simultaneously process is limited. As a result, when the user devices exceeding the limited number of user devices that can be processed are connected, all the user devices may not be able to provide services. What is needed is a method for allocating a resource of an audio manager to user devices.

Therefore, according to the embodiment of the present disclosure, the audio manager can prevent the situation where the service cannot be provided by notifying the user devices of the maximum number of user devices that the audio manager can manage. At this time, the audio manager may set a maximum service user parameter and transmit the parameter to the user device.

In detail, the fourth device transmits a first advertising message to peripheral devices (S17010). In this case, the first advertising message may include the maximum service user parameter indicating the maximum number of manageable user devices and/or an available service user parameter indicating the number of currently available user devices.

The first device transmits a first start recording message to the fourth device (S17020). The fourth device may enter a state capable of receiving an audio command by transmitting the start recording message.

The fourth device transmits a first start recording response message to the first device in response to the first start recording message (S17030). In step S17020, when the maximum service user parameter value included is 1 and the available service user parameter value is 1, the first start recording response message may include an intention to accept that the service is available.

Thereafter, the audio channel may be formed between the first device and the fourth device, and the first device may transmit the audio command to the fourth device through the formed audio channel.

The fourth device transmits a second advertising message to peripheral devices (S17040). In this case, since the second advertising message may include the maximum service user parameter and/or the available service user parameter and the audio channel with the first device is currently formed, the maximum service user parameter value may indicate 1 and the available service user parameter value may indicate 0.

In this case, the user device receiving the second advertising message may recognize that the available service user parameter value is 0 and may hold the start recording.

If the start recording request is received even if the user of the available service is 0, the audio manager may transmit a response message to the start recording to notify that the current processing is not possible.

That is, the second device and the third device transmit the second start recording message and the third start recording message to the fourth device, respectively, to form an audio channel (S17050 and S17060). The fourth device transmits the second start recording response message and the third start recording response message to the second device and the third device in response to the second start recording message and the third start recording message, respectively (S17070 and S17080). Since the fourth device currently does not have a user device available, the second start recording response message and the third start recording response message may include a rejection intention indicating that the service cannot be used.

In addition, the second start recording response message and the third start recording response message may include a wait time field. If the response message including the wait time field is received, the second device or the third device may transmit a message requesting the start recording again after the corresponding time elapses.

In one embodiment, when the maximum number of service users of the audio manager is 1, the user device may check a start recording message of another user device and hold its own start recording message.

In addition, in an embodiment of the present disclosure, the audio manager may manage audio commands received from a plurality of users by classifying states. In detail, the audio manager may manage the state of the audio manager in a collecting period for receiving a request of a voice recognition service of a user device and a service period for transmitting and receiving a voice recognition command (that is, an audio command). This will be described with reference to the following drawings.

FIG. 18 is a flowchart illustrating a method for processing audio commands received from a plurality of user devices according to an embodiment to which the present disclosure is applied.

Referring to FIG. 18, a first device, a second device, and a third device may be a user device, and a fourth device may be an audio manager device. In the present embodiment, it is assumed that the fourth device has a maximum of three manageable user devices.

First, the fourth device transmits a first advertising message to peripheral devices (S18010). In this case, the first advertising message may include a maximum service user parameter and/or an available service user parameter. The maximum service user parameter and the available service user parameter may indicate three.

The fourth device may receive start recording messages from the first device, the second device, and the third device during a collecting period (or in a collecting period state) and transmit a start recording response message including an accept or reject intention in response to a start recording message in consideration of the maximum number of service users and the number of available service users.

If there is no available service user, the fourth device transmits a second advertising message indicating that the available service user parameter is 0 to peripheral devices (S18030). The second advertising message may include a wait time field. If the advertising message including the wait time field is received, other user devices may transmit a message requesting the start recording after the time elapses.

The fourth device forms an audio channel with the first device, the second device, and the third device during the service period (or in the service period state) (S18040). In addition, the fourth device may receive an audio command through the formed audio channel to provide a voice recognition service.

FIGS. 19 and 20 are diagrams for describing a process of transmitting and receiving an audio command according to a state of an audio manager according to an embodiment to which the present disclosure is applied.

Referring to FIG. 19, it is assumed that there is one user device requesting reception of an audio command. When only one user device, not a plurality of user devices, requests formation of an audio channel, the audio manager may provide a voice recognition service without dividing a state into a collecting period and a service period. In FIG. 19, the first device may be an audio manager and the second device may be a user device.

In detail, the second device may transmit a start recording message and then transmit a voice command to the first device. The second device may transmit a recording stop message to the first device. For example, the recording stop message may be transmitted by the second device if a voice command is not been received from the user for a certain time.

Thereafter, the first device transmits a response to the voice command to the second device, and sends a termination response message to the second device. In the case of the voice command response (or voice response), for example, a response to a time question may have a data amount of 12 KBytes. It may take about 0.12 seconds based on the existing GATT-based transmission rate.

Referring to FIG. 20, it is assumed that there are two user devices requesting reception of an audio command. When a request for a voice recognition service is received from a plurality of user devices, the audio manager may classify the state and process the requests. In detail, the audio manager may classify the state into a collecting period and a service period.

In FIG. 20, the first device may be an audio manager, and the second device, the third device, and the fourth device may be user devices.

As described above, the collecting period represents a period (or state) of collecting a start recording message. For the user devices requested during this period, the first device (that is, the audio manager) may divide the service period and assign the divided service period to each user device. It is possible to exchange a voice command and a voice command response with each user device during the assigned period.

The audio manager may perform an advertisement for the audio channel formation during the collecting period. In this case, the advertising message may include an available service user parameter. If the available service user value is 0, the advertisement may be performed by including a corresponding parameter indicating 0, or the advertisement may not be performed because the voice recognition service is not available.

In addition, the service period represents a period during which a voice command and a voice command response are exchanged between the audio manager and the user devices. The voice recognition service may be provided to user devices that transmit the start recording message through the collecting period during the service period.

First, when the first device receives the start recording message by the second device and the third device during the collecting period, the first device transmits a response message thereto. The first device may provide a voice recognition service by allocating service periods in the order in which the start recording message is transmitted.

FIG. 21 is a flowchart illustrating a method for processing audio commands received from a plurality of user devices according to an embodiment to which the present disclosure is applied.

Referring to FIG. 21, a first device, a second device, and a third device may be a user device, and a fourth device may be an audio manager device.

The fourth device transmits a first advertising message to peripheral devices (S21010). In this case, the first advertising message may include a maximum service user parameter and/or an available service user parameter. It is assumed that the current maximum number of service users is 3 which is the number of available service user.

The first device transmits a first start recording message to the fourth device (S21020). The fourth device may enter a state capable of receiving an audio command by transmitting the start recording message. The fourth device transmits a first start recording response message to the first device in response to the first start recording message (S21030). In step S21020, when the maximum service user parameter value included is 3 and the available service user parameter value is 3, the first start recording response message may include an intention to accept that the service is available. In addition, the first start recording response message may include information related to an audio channel to be formed.

The fourth device transmits a second advertising message to peripheral devices (S21040). In this case, the second advertising message may include a maximum service user parameter and/or an available service user parameter. The maximum service user parameter may indicate 3 and the available service user parameter may indicate 2.

The second device transmits a second start recording message to the fourth device (S21050). The fourth device transmits a second start recording response message to the second device in response to the second start recording message (S21060). In step S21040, since the available service user parameter included indicates 2, the second start recording response message may include an acceptance intention indicating that the service is available. In addition, the second start recording response message may include information related to an audio channel to be formed.

The fourth device transmits a third advertising message to peripheral devices (S21070). In this case, the third advertising message may include a maximum service user parameter and/or an available service user parameter. The maximum service user parameter may indicate 3 and the available service user parameter may indicate 1.

The third device transmits a third start recording message to the fourth device (S21080). The fourth device transmits a second start recording response message to the second device in response to the second start recording message (S21090). In step S21070, since the available service user parameter included indicates 1, the third start recording response message may include an accept intention indicating that the service is available. In addition, the second start recording response message may include information related to an audio channel to be formed.

Thereafter, the audio channel may be formed between the first device and the fourth device, between the second device and the fourth device, and between the third device and the fourth device (S21100). The audio command may be transmitted and received through the formed audio channel.

The fourth device transmits a fourth advertising message to peripheral devices (S21110). The fourth advertising message may include information indicating that there are no more available users.

In FIG. 21, steps S21010 to S21090 may indicate a collecting period state of a fourth device (that is, an audio manager), and step S21100 may indicate a service period state of the fourth device.

In one embodiment, when the number of maximum service users is 3, the audio manager may use three processors to process the user device for each processor, and the audio channel may be formed to be managed by three devices to process audio command.

When forming the audio channel between the audio manager and the plurality of user devices, it is difficult to form a plurality of audio channels capable of simultaneously transmitting audio commands. Hereinafter, a method for allocating a time-divided audio channel to each user device and transmitting and receiving an audio command in the corresponding audio channel will be described.

FIGS. 22 and 23 are diagrams for describing a method for allocating audio channels for a plurality of user devices according to an embodiment to which the present disclosure is applied.

Referring to FIG. 22, it is assumed that a first device, a second device, and a third device may be a user device, and a fourth device may be an audio manager device.

The fourth device forms an audio channel with the first device and the second device that have requested the formation of the audio channel (S22010).

A voice command/response to be exchanged between the first device and the audio manager and a voice command/response to be exchanged between the second device and the audio manager require real-time property. Due to buffer limitations and speed of service, a delay for a voice command should not occur in all devices.

Therefore, the audio manager can receive voice commands transmitted from the first device and the second device through the ICO channel by considering two channels included in one stream without classifying into two streams. A channel represents a container carrying data (for example, left channel, right channel, and the like of a voice stream) that needs to be synchronized. In addition, a stream represents a container carrying continuous data as a higher concept including a set of ICO channels.

In this case, the fourth device may allocate an ICO channel interval (or audio channel interval) for transmitting and receiving audio signals to the first device and the second device, as shown in FIG. 23(c).

The ICO channel interval may include a first channel event allocated to the first device and a second channel event allocated to the second device. The first channel event and the second channel event may each include a plurality of sub event intervals.

If it is not necessary to directly process a voice command of any one user device (for example, when there is plenty of space in the buffer or it is not sensitive to delay), the audio manager may consider audio signals transmitted from each user device as an individual stream and process each audio signal.

Thereafter, the third device transmits a start recording message to the fourth device, and the fourth device transmits a start recording response message to the third device in response thereto (S22020).

When the number of user devices is changed to three, the fourth device performs an audio channel update procedure with the first device and the second device (S22030), and the fourth device forms the audio channel with the first device, the second device, and the third device (S22010). That is, the fourth device newly allocates and shares an audio channel to be used with all user devices.

In this case, the fourth device may allocate an ICO channel interval (or audio channel interval) for transmitting and receiving audio signals to the first device, the second device, and the third device as shown in FIG. 23(b).

The ICO channel interval may include a first channel event allocated to the first device, a second channel event allocated to the second device, and a third channel event allocated to the third device.

FIG. 24 is a diagram illustrating an example of an internal block diagram of a user device and an audio manager device according to an embodiment of the present disclosure.

Referring to FIG. 24, a user device may include a digital signal processor (DSP), an AI profile, a BLE S/W stack, and a MAC/PHY.

The audio manager may be implemented to include the DSP, the AI profile, the BLE S/W stack, the MAC/PHY, and an AI function. The AI function can communicate with the audio engine in a wired or wireless manner.

The DSP captures a user's voice, encodes the captured voice, and transmits the encoded voice to the AI profile.

The AI profile may include audio manager management, voice link management, and user authentication management.

The audio manager operating profile may manage a protocol for changing the state of the audio manager or understanding the state of the audio manager, such as a start recording message that causes the audio manager to enter a state capable of receiving a user's voice command or a recording stop message for terminating it.

The voice link operating profile may manage a BLE link generated between the audio manager and the user device. That is, a protocol for generating the BLE link or the audio link and transmitting data received from the DSP to the audio manager can be managed.

The user authentication operating profile may manage a protocol for storing user information in a user device by recognizing or authenticating a user, and registering the corresponding information between the audio manager and the user device.

The AI profile of the audio manager may further include multiple access management on profiles included in the AI profile of the user device. The multiple access operating profile represents a protocol for managing multiple user devices when the multiple user devices access the audio manager.

FIG. 25 is a flowchart illustrating a method for acquiring service authority between an audio manager and an AI authority manager depending on a user's location according to an embodiment of the present disclosure.

Referring to FIG. 25, a first device may be a user device, a second device may be an AI authority manager, a third device may be an audio manager, and a fourth device may be an audio processing engine (or an audio processing server).

The third device and the fourth device perform a location registration procedure (S25010). The third device (that is, the audio manager) may store location information of a location (for example, an airport, a mart, a department store, and the like) where the third device is installed at the time of installation. A policy related to what service can be performed depending on the location information of the location where the audio manager is installed may be managed by the fourth device (that is, an audio processing engine).

The second device and the third device perform a location information exchange procedure (S25020). That is, in the present embodiment, the AI authority manager may provide location information indicating where the user is to the audio manager.

The first device transmits a first start recording message to the second device (S25030). The first device transmits a voice command to the second device through the audio channel formed between the first device and the second device (S25040).

The second device transmits to the fourth device a first service request message requesting an interpretation of the received voice command or a service related thereto, and receives a first service response message from the fourth device in response thereto (S25050 and S25060). The fourth device may check the user information and the location information with respect to the service request of the second device according to the service policy, and determine whether the corresponding service can be provided at the location to which the user belongs. The first service response message may include information on whether the corresponding service can be provided at the location to which the user belongs.

The first device transmits a second start recording message to the third device (S25070). The first device transmits a voice command to the third device through the audio channel formed between the first device and the second device (S25080).

The third device transmits to the fourth device a second service request message requesting an interpretation of the received voice command or a service related thereto, and receives a second service response message from the fourth device in response thereto (S25090 and S25100).

According to the embodiment of the present disclosure, it is possible to provide differentiated services depending on the user's position or location.

FIG. 26 is a diagram illustrating an example of a method for exchanging location information between an authority manager and an audio manager according to an embodiment of the present disclosure.

Referring to FIG. 26, a first device may be an AI authority manager and a second device may be an audio manager.

The first device performs a user authentication (UA) registration session for exchange of location information (S27010). In step S27010, the first device and the second device may perform mutual authentication.

The first device and the second device perform a UA secure session (S27020). As a result, encrypted data may be exchanged between the first device and the second device.

The first device transmits a set distance bonding message (or request message) for measuring the distance between the first device and the second device to the second device (S26040). The second device transmits a distance check message (or response message) (S26050). In steps S26040 and S26050, the first device and the second device may exchange parameters for measuring the distance.

In other words, the set distance bonding message and/or the distance check message may include a parameter for measuring the distance, and the parameter for measuring the distance (that is, for example, received signal strength indication), window setting and the like.

In addition, the set distance bonding message and/or the distance check message may be exchanged in the form of an advertisement packet or may be exchanged in a GATT manner on a connection basis.

The second device may transmit location information to the first device (S26050).

FIG. 27 is a diagram illustrating an example of a usage environment according to an embodiment of the present disclosure.

First, a first user device 2760 may acquire a trigger voice command of peripheral audio managers (that is, a first audio manager 2730 and a second audio manager 2740). As described above with reference to FIGS. 15 and 16, a user uses (or calls) a service using a trigger voice command of the second audio manager 27040 without separately registering a trigger voice command of the second audio manager 27040 in the first user device 227060.

The user may have a first audio manager 2730 on his/her own phone. The first audio manager 2730 may recognize that the current user's location is the first spot 27010 from the second audio manager 27040 serving as an AI authority manager, and provide a service available only in the first spot 27010 to a user.

When the user moves the location to the second spot 2720, the first user device 27060 may understand the audio manager of the second spot 27020.

The first user device 27060 and the second user device 27080 may acquire a trigger voice command by the method described above with reference to FIGS. 15 and 16, and simultaneously transmit the voice command to the third audio manager 27050 by the method described with reference to FIGS. 17 to 23.

FIG. 28 is a diagram illustrating an example of a method for processing a voice command according to an embodiment of the present disclosure.

Referring to FIG. 28, the first device (that is, audio manager) transmits a first advertising message to peripheral devices (S28010).

In addition, as described above with reference to FIGS. 17 to 23, the first advertising message may include at least one of a maximum service user parameter indicating the maximum number of manageable maximum user devices or an available service user parameter indicating the number of currently available user devices.

The first device receives a first request message for requesting establishment of an audio channel for transmitting and receiving a voice command from a second device (that is, a user device) (S28020).

Here, the first request message may be referred to as a start recording message.

As described above with reference to FIG. 14, the first advertising message may include a public key of the first device, and the first request message may include a public key of the second device. In this case, the audio command received through the audio channel may be encrypted using the public key of the first device.

In addition, as described above with reference to FIGS. 15 and 16, the first device may transmit a trigger command (or a trigger voice command) registered in the first device to the second device. Here, the trigger command indicates a voice command which causes the first device to enter a state capable of receiving a voice command. In this case, the first request message may include the trigger command or information generated based on the trigger command.

In addition, the first device may select a bearer for transmitting a trigger command from advertising extension, advertising, or GATT. The first device may transmit the trigger command to the second device using the selected bearer.

The first device establishes an audio channel with the second device (S28030).

The first device receives a voice command instructing performance of a particular service from the second device through the audio channel (S28030).

In addition, as described above with reference to FIGS. 17 to 23, the first device may receive a second request message from a third device requesting the establishment of the audio channel for transmitting and receiving a voice command. The first response message including an accept or reject intention determined based on the values of the maximum service user parameter or the available service user parameter may be transmitted to the third device in response to the second request message.

As described above with reference to FIGS. 18 to 22, the audio manager may manage audio commands received from a plurality of users by dividing states. In detail, the audio manager may manage the state of the audio manager in a collecting period for receiving a request of a voice recognition service of a user device and a service period for transmitting and receiving a voice recognition command (that is, an audio command).

In this case, the first request message and the second request message are received during a collecting period in which a request of a voice recognition service of a plurality of user devices is received, and a voice command instructing performance of a particular service may be received during a service period that a voice command is transmitted and received.

In addition, as described above, the first device may divide a service period with respect to user devices requested during the collection and allocate the divided service period to each user device. That is, the service period may be divided and allocated to the second device and the third device of the device.

In addition, as described above with reference to FIG. 23, the first device may allocate a channel interval to the plurality of user devices. For example, the channel interval of the audio channel may include a first channel event allocated to the second device and a second channel event allocated to the third device.

In addition, as described above, the audio channel may be an isochronous channel.

In addition, as described above with reference to FIGS. 25 to 27, the service authority may be controlled depending on the user's location. That is, the first device may exchange location information with the second device and establish the audio channel with the second device based on the available service policy determined depending on the location of the second device.

The location information may include a received signal strength indication (RSSI) or a window setting parameter.

In the embodiments described hereinabove, components and features of the present disclosure were combined with each other in a predetermined form. It is to be considered that the respective components or features are selective unless separately explicitly mentioned. The respective components or features may be implemented in a form in which they are not combined with other components or features. In addition, some components and/or features may be combined with each other to configure the embodiment of the present disclosure. A sequence of operations described in the embodiments of the present disclosure may be changed. Some components or features of any embodiment may be included in another embodiment or be replaced by corresponding components or features of another embodiment. It is obvious that claims that do not have an explicitly referred relationship in the claims may be combined with each other to configure an embodiment or be included in new claims by amendment after application.

Embodiments of the present disclosure may be implemented by various means, for example, hardware, firmware, software, or a combination thereof, and the like. In the case in which an embodiment of the present disclosure is implemented by the hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which one embodiment of the present disclosure is implemented by the firmware or the software, it may be implemented in a form of a module, a procedure, a function, or the like, performing the functions or the operations described above. A software code may be stored in a memory and be driven by a processor. The memory unit may be positioned inside or outside the processor and transmit and receive data to and from the processor by various well-known means.

It is obvious to those skilled in the art that the present disclosure may be embodied in another specific form without departing from the essential feature of the present disclosure. Therefore, the above-mentioned detailed description is to be interpreted as being illustrative rather than being restrictive in all aspects. The scope of the present disclosure is to be determined by reasonable interpretation of the claims, and all modifications within an equivalent range of the present disclosure fall in the scope of the present disclosure. In the present specification, both the object disclosure and the method disclosure are described, and the description of both disclosures may be complementarily applied as necessary.

INDUSTRIAL APPLICABILITY

As described above, preferred embodiments of the present disclosure are disclosed for the purpose of illustration, and those skilled in the art can alternate, modify, replace, add or the lie various other embodiments within the spirit and technical scope of the present disclosure disclosed in the appended claims below.

The invention claimed is:

1. A method for processing a voice command received from at least one device using a Bluetooth low energy technology, the method performed by a first device comprising:
   transmitting a first advertising message including a maximum service user parameter indicating the maximum number of manageable user devices or an available service user parameter indicating the number of currently available user devices to a peripheral device;
   receiving a first request message requesting establishment of an audio channel for transmitting and receiving the voice command from a second device;
   establishing the audio channel with the second device;
   receiving a voice command instructing performance of a particular service from the second device through the audio channel;
   receiving a second request message requesting establishment of an audio channel for transmitting and receiving the voice command from a third device; and
   transmitting to the third device a first response message including an accept or reject intention determined based on values of the maximum service user parameter or the available service user parameter to the third device in response to the second request message.

2. The method of claim 1, wherein the first advertising message includes a public key of the first device,
   the first request message includes a public key of the second device, and
   an audio command received through the audio channel is encrypted using the public key of the first device.

3. The method of claim 1, further comprising:
   transmitting a trigger command registered in the first device to the second device,
   wherein the trigger command indicates a voice command which causes the first device to enter a state capable of receiving a voice command.

4. The method of claim 3, wherein the first request message includes the trigger command or information generated based on the trigger command.

5. The method of claim 3, wherein the transmitting of the trigger command includes selecting a bearer for transmitting the trigger command from advertising extension, advertising, or GATT, and the trigger command is transmitted to the second device using the selected bearer.

6. The method of claim 1, wherein the first request message and the second request message are received during a collecting period for receiving a request of a voice recognition service of a plurality of users, and
   the voice command instructing performance of the particular service is received during a service period for transmitting and receiving a voice command.

7. The method of claim 6, wherein the service period is divided and allocated to the second device and the third device.

8. The method of claim 1, wherein the establishing of the audio channel includes establishing the audio channel with the third device, and
   a channel interval of the audio channel includes a first channel event allocated to the second device and a second channel event allocated to the third device.

9. The method of claim 1, wherein the audio channel is an isochronous channel.

10. The method of claim 1, further comprising:
    exchanging location information with the second device,
    wherein in the establishing of the audio channel, an audio channel is established with the second device based on an available service policy determined depending on the location of the second device.

11. The method of claim 10, wherein the location information includes a received signal strength indication (RSSI) or a window setting parameter.

12. A first device for processing a voice command received from at least one device using a Bluetooth low energy technology, comprising:
    a communicator configured to communicate with an external device with a wired or wireless manner; and
    a processor configured to be functionally connected to the communicator,
    wherein the processor transmits a first advertising message including a maximum service user parameter indicating the maximum number of manageable user devices or an available service user parameter indicating the number of currently available user devices to a peripheral device;
    receives a first request message requesting establishment of an audio channel for transmitting and receiving the voice command from a second device;
    establishes the audio channel with the second device;
    receives a voice command instructing performance of a particular service from the second device through the audio channel;
    receives a second request message requesting establishment of an audio channel for transmitting and receiving the voice command from a third device; and
    transmits to the third device a first response message including an accept or reject intention determined based on values of the maximum service user parameter or the available service user parameter to the third device in response to the second request message.

* * * * *